United States Patent
Yang et al.

(10) Patent No.: US 10,277,432 B2
(45) Date of Patent: Apr. 30, 2019

(54) DATA PROCESSING METHOD AND DEVICE

(71) Applicant: Huawei Technologies Co., Ltd., Shenzhen (CN)

(72) Inventors: Wenbin Yang, Beijing (CN); Xinyuan Wang, Beijing (CN); Tongtong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 50 days.

(21) Appl. No.: 15/637,740

(22) Filed: Jun. 29, 2017

(65) Prior Publication Data

US 2017/0302484 A1 Oct. 19, 2017

Related U.S. Application Data

(63) Continuation of application No. PCT/CN2014/095824, filed on Dec. 31, 2014.

(51) Int. Cl.
*H04L 5/14* (2006.01)
*H04W 84/18* (2009.01)
(Continued)

(52) U.S. Cl.
CPC .......... *H04L 25/40* (2013.01); *H04L 12/2854* (2013.01); *H04L 12/433* (2013.01); *H04L 25/14* (2013.01); *G06F 13/385* (2013.01)

(58) Field of Classification Search
CPC combination set(s) only.
See application file for complete search history.

(56) References Cited

U.S. PATENT DOCUMENTS 7,995,696 B1 8/2011 Norrie
8,401,043 B1 3/2013 Kadosh et al.
(Continued)

FOREIGN PATENT DOCUMENTS

CN 101682450 A 3/2010
CN 102142987 A 8/2011
CN 102945215 2/2013

OTHER PUBLICATIONS

Wang et. al., "BER/FLR Calculation Results for Multiplexing in PMA," IEEE 802.3bs 400 GbE Task Force, Huawei Technologies Co. Ltd., pp. 1-13, (Jul. 9, 2014).
(Continued)

*Primary Examiner* — Faruk Hamza
*Assistant Examiner* — Abusayeed M Haque
(74) *Attorney, Agent, or Firm* — Leydig, Voit & Mayer, Ltd.

(57) ABSTRACT

The present invention provides a data processing method and device. A data processing device receives a first data stream, where the first data stream includes a first data unit; obtains a boundary of the first data unit; obtains a first skew according to a first data amount and the boundary of the first data unit; and adjusts the first data stream according to the first skew, so that a difference between the boundary of the first data unit and a boundary of the first data amount is a length of an integral quantity of first data units, so that a relatively small amount of data is needed in such an adjustment, that is, one data stream is adjusted, and an adjusted data stream can meet a basic condition for multiplexing, which reduces operation complexity and costs and is beneficial to deploy and implement bit width conversion.

17 Claims, 7 Drawing Sheets

(51) Int. Cl.
*H04L 12/801* (2013.01)
*H04L 25/40* (2006.01)
*H04L 12/28* (2006.01)
*H04L 12/433* (2006.01)
*H04L 25/14* (2006.01)
*G06F 13/38* (2006.01)

(56) References Cited

U.S. PATENT DOCUMENTS

| | | | |
|---|---|---|---|
| 8,867,683 B2 | 10/2014 | Thanigasalam | |
| 2003/0112668 A1* | 6/2003 | Takahashi | G11C 8/06 365/200 |
| 2003/0128895 A1* | 7/2003 | Schweid | G06K 9/3283 382/289 |
| 2004/0114831 A1* | 6/2004 | Notovitz | G06K 9/3283 382/296 |
| 2006/0092682 A1* | 5/2006 | Cho | G11C 5/063 365/63 |
| 2007/0103141 A1* | 5/2007 | Dixon | G01R 31/31725 324/76.63 |
| 2007/0177701 A1 | 8/2007 | Thanigasalam | |
| 2008/0031312 A1 | 2/2008 | Haas et al. | |
| 2008/0112142 A1* | 5/2008 | RaghuRam | G11C 5/04 361/736 |
| 2008/0130811 A1* | 6/2008 | Bae | G11C 5/063 375/355 |
| 2008/0263307 A1 | 10/2008 | Adachi | |
| 2009/0150728 A1 | 6/2009 | Barlow et al. | |
| 2009/0295449 A1* | 12/2009 | Dixon | G01R 31/31725 327/276 |
| 2010/0111100 A1 | 5/2010 | Baumer | |
| 2010/0202552 A1 | 8/2010 | Sakai et al. | |
| 2012/0030438 A1 | 2/2012 | Shafai et al. | |
| 2012/0044003 A1* | 2/2012 | Itou | H03L 7/0805 327/160 |
| 2015/0106538 A1* | 4/2015 | Vasudevan | G06F 3/061 710/74 |

OTHER PUBLICATIONS

"IEEE Standard for Ethernet, Amendment 2: Physical Layer Specifications and Management Parameters for 100 Gb/s Operation Over Backplanes and Copper Cables," IEEE Computer Society, IEEE Std 802.3bj-2014, pp. 1-335, Institute of Electrical and Electronics Engineers, New York, New York (Jun. 12, 2014).

"Draft Standard for Ethernet, Amendment: Media Access Control Parameters, Physical Layers and Management Parameters for 400 Gb/s Operation," IEEE Computer Society, IEEE P802.3bs/D0.9, pp. 1-257, Institute of Electrical and Electronics Engineers, New York, New York (Sep. 4, 2015).

"Part 3: Carrier Sense Multiple Access with Collision Detection (CSMA/CD) Access Method and Physical Layer Specifications, Amendment: Media Access Control Parameters, Physical Layers and Management Parameters for 40 Gb/s and 100 Gb/s Operation," IEEE Computer Society, IEEE P802.3ba D3.2, pp. 1-461, Institute of Electrical and Electronics Engineers, New York, New York (Mar. 24, 2010).

"Draft Standard for Ethernet, Amendment: Physical Layer Specifications and Management Parameters for 40 Gb/s and 100 Gb/s Operation Over Fiber Optic Cables," IEEE Computer Society, IEEE P802.3bm/D2.1, pp. 1-180, Institute of Electrical and Electronics Engineers, New York, New York (Feb. 7, 2014).

* cited by examiner

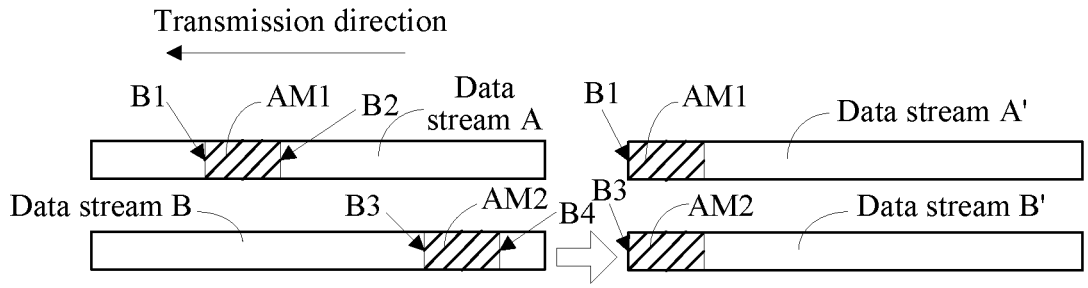

FIG. 1

```
┌─────────────────────────────────────────────┐
│ A data processing device receives a first   │
│ data stream, where the first data stream    │      S201
│ includes a first data unit and a second     │  ┌──
│ data unit, and the first data unit and the  │
│ second data unit have a same length         │
└─────────────────────────────────────────────┘
                      │
                      ▼
┌─────────────────────────────────────────────┐
│ The data processing device obtains a        │     S202
│ boundary of the first data unit             │  ┌──
└─────────────────────────────────────────────┘
                      │
                      ▼
┌─────────────────────────────────────────────┐
│ The data processing device obtains a first  │
│ skew according to a first data amount and   │
│ the boundary of the first data unit, where  │     S203
│ the first data amount is data that is       │  ┌──
│ received by the data processing device in   │
│ a preset time, and the first data amount    │
│ includes the boundary of the first data unit│
└─────────────────────────────────────────────┘
                      │
                      ▼
┌─────────────────────────────────────────────┐
│ The data processing device adjusts the      │
│ first data stream according to the first    │
│ skew, so that a difference between the      │     S204
│ boundary of the first data unit and a       │  ┌──
│ boundary of the first data amount is a      │
│ length of an integral quantity of first     │
│ data units                                  │
└─────────────────────────────────────────────┘
```

FIG. 2

DATA PROCESSING METHOD AND DEVICE

CROSS-REFERENCE TO RELATED APPLICATIONS

This application is a continuation of International Application No. PCT/CN2014/095824, filed on Dec. 31, 2014, the disclosure of which is hereby incorporated by reference in its entirety.

TECHNICAL FIELD

The present invention relates to the field of communications technologies, and in particular, to a data processing method and device.

BACKGROUND

On the Ethernet, there is an apparatus that supports different transmission rates or bit widths according to different requirements, and the apparatus is configured to receive and/or send data. Under the precondition that a total rate of the Ethernet is constant, a transmission rate supported by a single data interface of the apparatus is inversely proportional to a quantity of data interfaces included in the apparatus. For example, on the Ethernet with a total rate of 400 gigabits (G), a device A includes 16 first data interfaces that support a rate of 25 G, and a device B includes eight second data interfaces that support a rate of 50 G. The device A receives a first data stream through the first data interface, and bit widths of 16 first data streams that are received by the device A through the 16 first data interfaces are the same. When the device A needs to send data to the device B, the device A converts the received 16 first data streams to eight second data streams. The device A sends the eight second data streams to the device B. Each second data interface of the device B receives one second data stream. The conversion may be referred to as data processing. In a process in which the device A converts the first data stream to the second data stream, a bit width of the second data stream is changed when compared with a bit width of the first data stream. Therefore, the data processing may also be referred to as bit width conversion.

Currently, bit width conversion is mainly implemented by distributing and multiplexing data units included in a data stream. An example in which the device A performs bit width conversion of converting the 16 first data streams to the eight second data streams is used. A manner of implementing bit width conversion by means of distribution and multiplexing specifically includes: the 16 first data interfaces included in the device A may be connected to 16 channels, and each channel is configured to transmit one first data stream. A data unit in the first data stream may carry an alignment marker (AM). Using one first data stream in the 16 first data streams as an example, an AM carried by the first data stream corresponds to a channel that transmits the first data stream. Each first data stream in the 16 first data streams carries one AM. The device A aligns the 16 AMs according to the AM carried by each first data stream, that is, performs a deskew operation by means of alignment marker lock (AM Lock), so that the device A can read the 16 AMs at a same moment before performing bit width conversion on the 16 first data streams, so as to eliminate a skew generated in a transmission process of the 16 first data streams. The device A may multiplex the aligned 16 first data streams, to generate the eight second data streams. In the existing manner of implementing bit width conversion by means of distribution and multiplexing, the device A needs to obtain, before performing bit width conversion, a relative position of the AM carried by each first data stream in the 16 first data streams. The device A performs a deskew operation by means of the AM Lock for the 16 first data streams according to the obtained relative position, to eliminate a skew of each first data stream. An existing method used for eliminating a skew in a data stream increases operation complexity and costs, so that bit width conversion by means of distribution and multiplexing is difficult to deploy and implement.

SUMMARY

Embodiments of the present invention provide a data processing method and device, which help to implement flexible data processing and reduce a difficulty of data processing.

According to a first aspect, an embodiment of the present invention provides a data processing method, where the method includes:

receiving, by a data processing device, a first data stream, where the first data stream includes a first data unit and a second data unit, and the first data unit and the second data unit have a same length;

obtaining, by the data processing device, a boundary of the first data unit;

obtaining, by the data processing device, a first skew according to a first data amount and the boundary of the first data unit, where the first data amount is data that is received by the data processing device within a preset time, and the first data amount includes the boundary of the first data unit; and adjusting, by the data processing device, the first data stream according to the first skew, so that a difference between the boundary of the first data unit and a boundary of the first data amount is a length of an integral quantity of first data units.

In a first possible implementation manner of the first aspect, the first data unit carries an AM, and the obtaining, by the data processing device, a boundary of the first data unit includes:

identifying, by the data processing device in an AM Lock manner, a boundary of the AM carried by the first data unit, where the boundary of the AM is the boundary of the first data unit.

With reference to the first aspect or the first possible implementation manner of the first aspect, in a second possible implementation manner, the adjusting, by the data processing device, the first data stream according to the first skew includes:

obtaining, by the data processing device, a first length according to a difference between a length of the first skew and the length of the integral quantity of first data units, where the first length is less than the length of the first data unit; and removing, by the data processing device, data that starts from the boundary of the first data amount and whose length is the first length, to obtain the adjusted first data stream.

With reference to the first aspect or the first possible implementation manner of the first aspect, in a third possible implementation manner, the adjusting, by the data processing device, the first data stream according to the first skew includes:

removing, by the data processing device, data that starts from the boundary of the first data amount and whose length is a second length, to obtain the adjusted first data stream, where the second length is a length of the first skew.

With reference to the first aspect or the first or the second or the third possible implementation manner of the first aspect, in a fourth possible implementation manner, the length of the first data amount is a positive integer multiple of the length of the first data unit.

With reference to the first aspect or the first or the second or the third or the fourth possible implementation manner of the first aspect, in a fifth possible implementation manner, the method further includes:

receiving, by the data processing device, a second data stream, where the second data stream includes a first data unit and a second data unit, and the first data unit of the second data stream and the second data unit of the second data stream have a same length;

obtaining, by the data processing device, a boundary of the first data unit of the second data stream;

obtaining, by the data processing device, a second skew according to a second data amount and the boundary of the first data unit of the second data stream, where the second data amount is data that is received by the data processing device in the preset time, and the second data amount includes the boundary of the first data unit of the second data stream; and adjusting, by the data processing device, the second data stream according to the second skew, so that a difference between the boundary of the first data unit of the second data stream and a boundary of the second data amount is a length of an integral quantity of first data units of the second data stream.

With reference to the fifth possible implementation manner of the first aspect, in a sixth possible implementation manner, the method further includes:

sending, by the data processing device, the adjusted first data stream and the adjusted second data stream by using the length of the first data unit of the first data stream as a granularity, where the length of the first data unit of the first data stream is the same as the length of the first data unit of the second data stream.

With reference to the fifth possible implementation manner of the first aspect, in a seventh possible implementation manner, the method further includes:

sending, by the data processing device, the adjusted first data stream and the adjusted second data stream to a multiplexer, where the multiplexer is configured to multiplex the adjusted first data stream and the adjusted second data stream, to generate a third data stream.

According to a second aspect, an embodiment of the present invention provides a data processing device, where the device includes:

a first receiving unit, configured to receive a first data stream, where the first data stream includes a first data unit and a second data unit, and the first data unit and the second data unit have a same length;

a first obtaining unit, configured to obtain a boundary of the first data unit;

a second obtaining unit, configured to obtain a first skew according to a first data amount and the boundary of the first data unit, where the first data amount is data that is received by the data processing device within a preset time, and the first data amount includes the boundary of the first data unit; and a first adjustment unit, configured to adjust the first data stream according to the first skew, so that a difference between the boundary of the first data unit and a boundary of the first data amount is a length of an integral quantity of first data units.

In a first possible implementation manner of the second aspect, the first data unit carries an AM; and the first obtaining unit is specifically configured to identify, in an AM Lock manner, a boundary of the AM carried by the first data unit, where the boundary of the AM is the boundary of the first data unit.

With reference to the second aspect or the first possible implementation manner of the second aspect, in a second possible implementation manner, the first adjustment unit is specifically configured to obtain a first length according to a difference between a length of the first skew and the length of the integral quantity of first data units, where the first length is less than the length of the first data unit; and the first adjustment unit is specifically configured to remove data that starts from the boundary of the first data amount and whose length is the first length, to obtain the adjusted first data stream.

With reference to the second aspect or the first possible implementation manner of the second aspect, in a third possible implementation manner, the first adjustment unit is specifically configured to remove data that starts from the boundary of the first data amount and whose length is a second length, to obtain the adjusted first data stream, where the second length is a length of the first skew.

With reference to the second aspect or the first or the second or the third possible implementation manner of the second aspect, in a fourth possible implementation manner, the length of the first data amount is a positive integer multiple of the length of the first data unit.

With reference to the second aspect or the first or the second or the third or the fourth possible implementation manner of the second aspect, in a fifth possible implementation manner, the device further includes:

a second receiving unit, configured to receive a second data stream, where the second data stream includes a first data unit and a second data unit, and the first data unit of the second data stream and the second data unit of the second data stream have a same length;

a third obtaining unit, configured to obtain a boundary of the first data unit of the second data stream;

a fourth obtaining unit, configured to obtain a second skew according to a second data amount and the boundary of the first data unit of the second data stream, where the second data amount is data that is received by the data processing device in the preset time, and the second data amount includes the boundary of the first data unit of the second data stream; and a second adjustment unit, configured to adjust the second data stream according to the second skew, so that a difference between the boundary of the first data unit of the second data stream and a boundary of the second data amount is a length of an integral quantity of first data units of the second data stream.

With reference to the fifth possible implementation manner of the second aspect, in a sixth possible implementation manner, the device further includes:

a sending unit, configured to send the adjusted first data stream and the adjusted second data stream by using the length of the first data unit of the first data stream as a granularity, where the length of the first data unit of the first data stream is the same as the length of the first data unit of the second data stream.

With reference to the fifth possible implementation manner of the second aspect, in a seventh possible implementation manner, the device further includes:

a sending unit, configured to send the adjusted first data stream and the adjusted second data stream to a multiplexer, where the multiplexer is configured to multiplex the adjusted first data stream and the adjusted second data stream, to generate a third data stream.

With reference to the second aspect or the first or the second or the third or the fourth or the fifth or the sixth or the seventh possible implementation manner of the second aspect, in an eighth possible implementation manner, the data processing device is a routing device, a switch, or an electric chip.

As can be seen from the foregoing technical solutions, a data processing device acquires, within a preset time, a first data amount including a first data unit, and determines a first skew according to a boundary of the first data amount and a boundary of the first data unit. The data processing device adjusts a first data stream according to the first skew, so that a difference between the boundary of the first data unit and the boundary of the first data amount is a length of an integral quantity of first data units, so that relatively little data is needed in such an adjustment, that is, one data stream is adjusted, and the adjusted data stream can meet a basic condition for multiplexing, which reduces operation complexity and costs and is beneficial to deploy and implement bit width conversion.

BRIEF DESCRIPTION OF DRAWINGS

FIG. 1 is a schematic diagram of performing a deskew operation on a data stream;

FIG. 2 is a flowchart of a data processing method according to an embodiment of the present invention;

DESCRIPTION OF EMBODIMENTS

Figure 3:
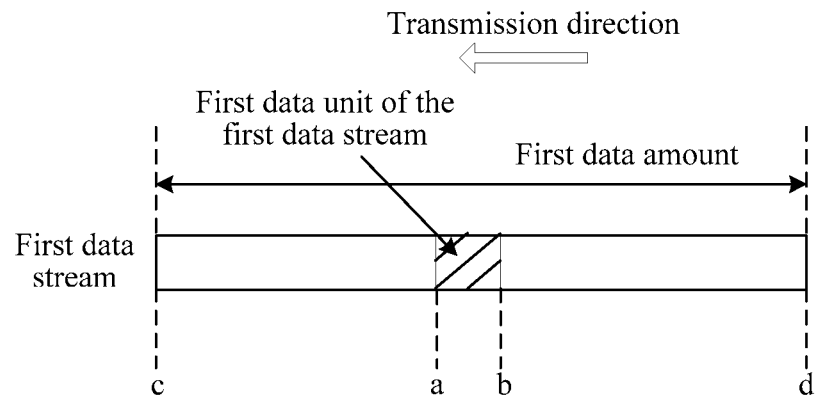
FIG. 3 is a schematic diagram of a first data stream according to an embodiment of the present invention.

To make objectives, technical solutions, and advantages of embodiments of the present invention clearer, the following clearly describes technical solutions in embodiments of the present invention with reference to the accompanying drawings. The described embodiments are some rather than all of the embodiments of the present invention.

FIG. 1 is a schematic diagram of performing a deskew operation on a data stream. A scenario shown in FIG. 1 is a scenario in which a deskew operation is performed on two data streams. In the scenario shown in FIG. 1, a data stream A and a data stream B are two data streams before the deskew operation. The data stream A carries an AM1, and the data stream B carries an AM2. A data stream A' is a data stream that is obtained after the deskew operation is performed on the data stream A. A data stream B' is a data stream that is obtained after the deskew operation is performed on the data stream B. A front boundary of the AM1 is the same as a boundary of a data unit carrying the AM1. A front boundary of the AM2 is the same as a boundary of a data unit carrying the AM2. A front boundary of any AM is a boundary, which is located in front in a transmission direction, of the any AM. The transmission direction is a transmission direction of a data stream, and as shown in FIG. 1, may be a transmission direction of the data stream A or a transmission direction of the data stream B. The transmission direction of the data stream A is the same as the transmission direction of the data stream B. As shown in FIG. 1, the front boundary of the AM1 may be represented as B1, and a rear boundary of the AM1 may be represented as B2. The front boundary of the AM2 may be represented as B3, and a rear boundary of the AM2 may be represented as B4.

A device may receive the data stream A and the data stream B, and can perform a deskew operation on the data stream A and the data stream B. Using an example in which the AM1 is used as a reference AM, the device may obtain a relative position of B3 relative to B1. The device may adjust, according to the relative position of B3 relative to B1, B3 to be aligned with B1, to obtain the data stream B'. The data stream A' may be the same as the data stream A, that is, the AM1 of the data stream A is the reference AM, and the device may not perform a deskew operation on the data stream A. The front boundary of the AM1 carried by the data stream A' is aligned with the front boundary of the AM2 carried by the data stream B'.

Because B1 overlaps the boundary of the data unit carrying the AM1, and B3 overlaps the boundary of the data unit carrying the AM2, a boundary of a data unit included in the data stream A' and a boundary of a data unit included in the data stream B' are located at a same position, that is, previously, there is no skew between the boundary of the data unit included in the data stream A' and the boundary of the data unit included in the data stream B'.

In the scenario shown in FIG. 1, when the device performs the deskew operation on the data stream A and the data stream B, the device needs to store the data stream A and the data stream B at the same time. The device further needs to analyze a relative position of an AM carried by each data stream in the data stream A and the data stream B, which increases operation complexity and costs, and wastes many first input first output (FIFO) resources.

For the foregoing problem, a method that helps to simplify complexity of a deskew operation and reduces FIFO resources is proposed. In the solution, a data processing device receives a first data stream, where the first data stream includes a first data unit and a second data unit, and the first data unit and the second data unit have a same length; the data processing device obtains a boundary of the first data unit; the data processing device obtains a first skew according to a first data amount and the boundary of the first data unit, where the first data amount is data that is received by the data processing device within a preset time, and the first data amount includes the boundary of the first data unit; and the data processing device adjusts the first data stream according to the first skew, so that a difference between the boundary of the first data unit and a boundary of the first data amount is a length of an integral quantity of first data units. In this way, the data processing device does not need to perform a deskew operation on another data stream by using a data stream as a reference, and the data processing device can adjust a single data stream, which helps to reduce an amount of data that needs to be processed, reduces operation complexity and costs, helps to reduce FIFO resources, and is beneficial to deploy and implement bit width conversion.

Embodiment 1

FIG. 2 is a flowchart of a data processing method according to an embodiment of the present invention. The method includes:

S201: A data processing device receives a first data stream, where the first data stream includes a first data unit and a second data unit, and the first data unit and the second data unit have a same length.

Using an example for description, the first data stream may be any data stream in parallel data streams that are obtained after forward error correction (FEC) processing. For example, an FEC module may receive or generate a codeword (CW). The FEC module converts the codeword to multiple data units, and then, outputs the multiple data units to the data processing device in a parallel manner, where any data stream in the parallel data streams may be the first data stream. If a size of a codeword is 5280 bits, and a size of a data unit is 10 bits, one codeword may include 528 data units, and the FEC module may output the 528 data units to the data processing device by using two parallel data streams.

The first data stream may be one of at least two data streams that are used to perform bit width conversion. The first data stream may be a data stream that is obtained after the FEC processing. The first data stream may include multiple data units, for example, the first data unit and the second data unit. The length of the first data unit of the first data stream may be at least one bit, that is, the first data unit of the first data stream may include one bit or more than one bit. For example, the first data unit of the first data stream may be a symbol, and a length of the symbol may be 10 bits. The length of the first data unit of the first data stream may also be one bit. The length of the first data unit of the first data stream is not described by using an example herein. The length of the first data unit of the first data stream is the same as the length of the second data unit of the first data stream, which may be that the first data unit of the first data stream and the second data unit of the first data stream have a same quantity of bits, for example, the first data unit of the first data stream is a symbol, and the second data unit of the first data stream is also a symbol.

S202: The data processing device obtains a boundary of the first data unit.

Using an example for description, the boundary of the first data unit may be a front boundary of the first data unit of the first data stream or a rear boundary of the first data unit of the first data stream. The front boundary of the first data unit may be understood as a boundary, which is located in front in a transmission direction, in two boundaries included in the first data unit. The transmission direction is a transmission direction of the first data stream. The rear boundary of the first data unit may be understood as a boundary, which is located in rear in the transmission direction, in the two boundaries included in the first data unit.

FIG. 3 is a schematic structural diagram of a first data stream according to an embodiment of the present invention. It is set that the transmission direction of the first data stream is a direction of an arrow shown in FIG. 3, that is, the shown transmission direction of the first data stream may be from right to left; and a and b may be separately used to identify a boundary of the first data unit of the first data stream. If the transmission direction of the first data stream is the direction of the arrow shown in FIG. 3, a may be used to identify the front boundary of the first data unit of the first data stream, and b may be used to identify the rear boundary of the first data unit of the first data stream. Using the transmission direction shown in FIG. 3 as an example, a may be received by the data processing device before b, or, in the transmission direction, a is in front of a position of b. If the transmission direction of the first data stream is reverse to the transmission direction shown in FIG. 3, a may be used to identify the rear boundary of the first data unit of the first data stream, and b may be used to identify the front boundary of the first data unit of the first data stream.

Using an example for description, the data processing device may obtain the boundary of the first data unit of the first data stream in an AM Lock manner or in a forward error correction codeword lock (FEC_CW Lock) manner, which is described in detail in the following Embodiment 2 and is not described in detail herein again. A method for obtaining the boundary of the first data unit of the first data stream is not limited in this embodiment of the present invention.

S203: The data processing device obtains a first skew according to a first data amount and the boundary of the first data unit, where the first data amount is data that is received by the data processing device within a preset time, and the first data amount includes the boundary of the first data unit.

Using an example for description, the first data amount may be some contiguous data of the first data stream, and the boundary of the first data amount may be a front boundary of the first data amount or a rear boundary of the first data amount. The front boundary of the first data amount may be a boundary, which is located in front in the transmission direction, in two boundaries included in the first data amount. The transmission direction is the transmission direction of the first data stream. The rear boundary of the first data amount may be understood as a boundary, which is located in rear in the transmission direction, in the two boundaries included in the first data amount.

Optionally, the preset time may include one or more clock periods, and the clock period may be understood as a period of a work clock of the data processing device.

Optionally, the length of the first data amount is a positive integer multiple of the length of the first data unit. In this embodiment of the present invention, the length of the first data amount may also be a value of the first data amount, that is, the length of the first data amount may be a quantity of bits included in the first data amount. Similarly, in this embodiment of the present invention, the length of the first data unit may also be the value of the first data amount, that is, the length of the first data unit may be the quantity of bits included in the first data unit.

In FIG. 3, it is set that the transmission direction of the first data stream is the direction of the arrow shown in FIG. 3, that is, the transmission direction of the shown first data stream may be from right to left; and c and d may be separately used to identify a boundary of the first data amount. Using the transmission direction shown in FIG. 3 as an example, c may be used to identify the front boundary of the first data amount, and d may be used to identify the rear boundary of the first data amount. In the two boundaries included in the first data amount, for example, in c and d, c may be received by the data processing device before d, or, in the transmission direction, a position of c is in front of a position of d. If the transmission direction of the first data stream is reverse to the transmission direction shown in FIG. 3, c is the rear boundary of the first data amount, and d is the front boundary of the first data amount.

Using an example for description, the obtaining, by the data processing device, a first skew according to a first data amount and the boundary of the first data unit includes: obtaining, by the data processing device, the first skew according to the front boundary of the first data amount and the front boundary of the first data unit of the first data stream. As shown in FIG. 3, the first skew may be a length between c and a shown in FIG. 3, that is, a quantity of bits between c and a shown in FIG. 3. Alternatively, the obtaining, by the data processing device, a first skew according to a first data amount and the boundary of the first data unit includes: obtaining, by the data processing device, the first skew according to the rear boundary of the first data amount and the rear boundary of the first data unit of the first data stream. As shown in FIG. 3, the first skew may be a length between b and d shown in FIG. 3, that is, a quantity of bits between b and d shown in FIG. 3. Alternatively, the obtaining, by the data processing device, a first skew according to a first data amount and the boundary of the first data unit includes: obtaining, by the data processing device, the first skew according to the front boundary of the first data amount and the rear boundary of the first data unit of the first data stream. As shown in FIG. 3, the first skew may be a length between c and b shown in FIG. 3, that is, a quantity of bits between c and b shown in FIG. 3. Alternatively, the obtaining, by the data processing device, a first skew according to a first data amount and the boundary of the first data unit includes: obtaining, by the data processing device, the first skew according to the rear boundary of the first data amount and the front boundary of the first data unit of the first data stream. As shown in FIG. 3, the first skew may be a length between a and d shown in FIG. 3, that is, a quantity of bits between a and d shown in FIG. 3.

S204: The data processing device adjusts the first data stream according to the first skew, so that a difference between the boundary of the first data unit and a boundary of the first data amount is a length of an integral quantity of first data units.

Using an example for description, the boundary of the first data unit of the first data stream in S204 may be the same as the boundary of the first data unit of the first data stream that is used to obtain the first skew in S203. The boundary of the first data amount in S204 may be the same as the boundary of the first data amount that is used to obtain the first skew in S203. For example, in S203, if the data processing device obtains the first skew according to the front boundary of the first data amount and the front boundary of the first data unit of the first data stream, in S204, the data processing device adjusts the first data stream by using the first skew, so that a difference between the front boundary of the first data unit of the first data stream and the front boundary of the first data amount is a length of an integral quantity of first data units of the first data stream.

Using an example for description, the boundary of the first data unit of the first data stream in S204 may be different from the boundary of the first data unit of the first data stream that is used to obtain the first skew in S203. The boundary of the first data amount in S204 may be different from the boundary of the first data amount and the first data unit of the first data stream that is used to obtain the first skew in S203. For example, in S203, if the data processing device obtains the first skew according to the rear boundary of the first data amount and the rear boundary of the first data unit of the first data stream, in S204, the data processing device adjusts the first data stream by using the first skew, so that a difference between the front boundary of the first data unit of the first data stream and the front boundary of the first data amount is a length of an integral quantity of first data units of the first data stream. In S203, if the data processing device obtains the first skew according to the front boundary of the first data amount and the rear boundary of the first data unit of the first data stream, in S204, the data processing device adjusts the first data stream by using the first skew, so that a difference between the front boundary of the first data unit of the first data stream and the front boundary of the first data amount is a length of an integral quantity of first data units of the first data stream. In S203, if the data processing device obtains the first skew according to the rear boundary of the first data amount and the front boundary of the first data unit of the first data stream, in S204, the data processing device adjusts the first data stream by using the first skew, so that a difference between the front boundary of the first data unit of the first data stream and the front boundary of the first data amount is a length of an integral quantity of first data units of the first data stream. In S203, if the data processing device obtains the first skew according to the front boundary of the first data amount and the front boundary of the first data unit of the first data stream, in S204, the data processing device adjusts the first data stream by using the first skew, so that a difference between the rear boundary of the first data unit of the first data stream and the rear boundary of the first data amount may be a length of an integral quantity of first data units of the first data stream. Possible implementation manners are not described one by one by using an example herein.

In this embodiment of the present invention, if a length of the first skew is K times of the length of the first data unit, where K is an integer greater than or equal to 1, the data processing device may not adjust the first data stream.

In this embodiment of the present invention, a data processing device acquires, within a preset time, a first data amount including a boundary of a first data unit; the data processing device determines a first skew according to the first data amount and the boundary of the first data unit; and the data processing device adjusts a first data stream according to the first skew, so that a difference between the boundary of the first data unit and a boundary of the first data amount is a length of an integral quantity of first data units. The data processing device adjusts, by using the first data amount as a reference, a skew of the boundary of the first data unit relative to the boundary of the first data amount, which helps to reduce data that needs to be processed; and the adjusted first data stream obtained by the data processing device can meet a subsequent condition for bit width conversion, which reduces operation complexity and costs, is beneficial to deploy and implement bit width conversion, and helps to reduce occupied FIFO resources.

Embodiment 2

Embodiment 2 of the present invention provides a manner of obtaining the boundary of the first data unit of the first data stream. The manner of obtaining the boundary of the first data unit that is provided by Embodiment 2 of the present invention may be applied to the method provided by Embodiment 1, or may be applied to acquisition of a boundary of a first data unit of another data stream, which is not described in detail herein again. The first data unit in Embodiment 2 of the present invention may carry an AM, where a front boundary of the AM may overlap the front boundary of the first data unit, or a rear boundary of the AM may overlap the rear boundary of the first data unit. The data processing device may learn the boundary of the first data unit of the first data stream at the same time when determining or after determining a boundary of the AM. The first data unit mentioned in Embodiment 2 of the present invention is the first data unit of the first data stream.

Using an example for description, the data processing device may identify, in an AM Lock manner, the boundary of the AM carried by the first data unit. The data processing device may also identify, in an FEC_CW Lock manner, a boundary of an FEC_CW carried by the first data stream, and determines the boundary of the first data unit according to the boundary of the FEC_CW.

Using an example for description, the AM of the first data stream may be used to identify the first data stream. The data processing device may identify the first data stream by using the AM. If the front boundary of the AM overlaps the front boundary of the first data unit, the data processing device may identify the front boundary of the AM, and perform an alignment operation on the first data stream according to the front boundary of the AM. If the rear boundary of the AM overlaps the rear boundary of the first data unit, the data processing device may identify the rear boundary of the AM, and perform an alignment operation on the first data stream according to the rear boundary of the AM.

Figure 4:
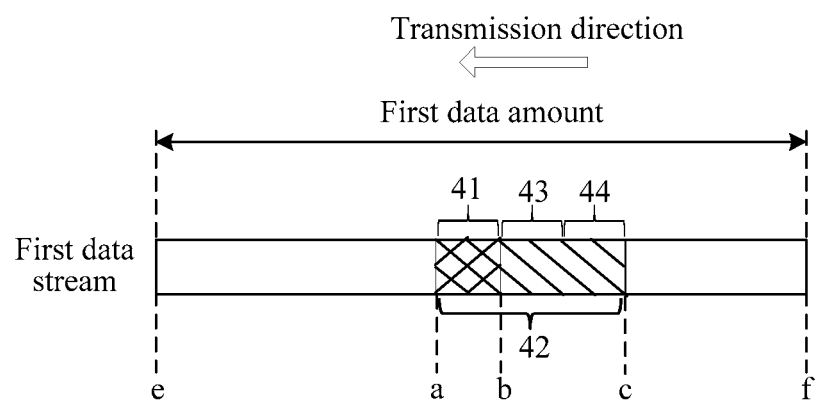
FIG. 4 is a schematic diagram of a first data stream carrying an AM according to an embodiment of the present invention.

FIG. 4 is a schematic structural diagram of a first data stream carrying an AM according to an embodiment of the present invention. As shown in FIG. 4, the transmission direction of the first data stream is a direction of an arrow in FIG. 4, that is, the shown transmission direction of the first data stream is from right to left. In FIG. 4, 42 may be used to identify the AM; and 41, 43, and 44 in FIG. 4 are separately used to identify a data unit in the first data stream. A length of the data unit identified by 41 is the same as a length of a data unit identified by 43, and the length of the data unit identified by 43 is the same as a length of a data unit identified by 44. The data unit identified by 41 in FIG. 4 may carry some data of the AM. The data unit identified by 43 in FIG. 4 may carry some data of the AM. The data unit identified by 44 in FIG. 4 may carry some data of the AM. a and b may be separately used to identify a boundary of the data unit identified by 41. In the transmission direction of the first data stream shown in FIG. 4, a is a front boundary of the data unit identified by 41, and b is a rear boundary of the data unit identified by 41. a and c may be separately used to identify a boundary of the AM. In the transmission direction of the first data stream shown in FIG. 4, a may be used to identify the front boundary of the AM, and c may be used to identify the rear boundary of the AM. e and f may be separately used to identify a boundary of the first data amount. In the transmission direction of the first data stream shown in FIG. 4, e is the front boundary of the first data amount, and f is the rear boundary of the first data amount.

Using an example for description, the AM may occupy one or more data units in the first data stream, for example, the AM may occupy three data units, for example, the data units that are separately identified by 41, 43, and 44 in FIG. 4, or the AM may occupy 3.5 data units. For example, if a length of the AM is greater than or equal to the length of the first data unit of the first data stream, that the boundary of the AM overlaps the boundary of the first data unit of the first data stream may include: A first case: the front boundary of the AM overlaps the front boundary of the first data unit of the first data stream. The first data unit of the first data stream is the data unit identified by 41 in FIG. 4, the AM is 42 in FIG. 4, and the first data unit of the first data stream is a data unit carrying the front boundary of the AM. The front boundary of the AM and the front boundary of the first data unit of the first data stream are both a. The rear boundary of the AM may overlap the rear boundary of the first data unit of the first data stream, or may not overlap the rear boundary of the first data unit of the first data stream. A second case: the rear boundary of the AM may overlap the rear boundary of the first data unit of the first data stream. The first data unit may be the data unit identified by 44 in FIG. 4, the AM is 42 in FIG. 4, and the first data unit of the first data stream is a data unit carrying the rear boundary of the AM. The rear boundary of the AM and the rear boundary of the first data unit of the first data stream are both c. The front boundary of the AM may overlap the front boundary of the first data unit of the first data stream, or may not overlap the front boundary of the first data unit of the first data stream. If the length of the AM is less than the length of the first data unit of the first data stream, the front boundary of the AM overlaps the front boundary of the first data unit of the first data stream, or the rear boundary of the AM overlaps the rear boundary of the first data unit of the first data stream. When reading the first data amount of the first data stream, the data processing device may determine, by identifying the boundary of the AM carried by the first data stream, the boundary of the first data unit carrying the AM in the first data stream.

The AM Lock manner may be a process of locking the AM carried by the first data stream. The data processing device may determine a position of the boundary of the AM in the AM Lock manner. Using an example for description, the data processing device preconfigures an AM pattern of the first data stream. The data processing device may perform matching between the first data stream and the AM pattern, to identify the AM of the first data stream. For example, the first data stream carries at least two AMs, for example, an AM1 and an AM2, where the AM1 is adjacent to the AM2, and a rear boundary of the AM1 and a front boundary of the AM2 are located in different data amounts. If the data processing device determines, in the AM Lock manner, that the AM1 and the AM2 separately match the AM pattern, the data processing device locks the first data stream. If the data processing device needs to learn the front boundary of the first data unit of the first data stream, the data processing device may use a front boundary of either AM of the AM1 and the AM2 as the front boundary of the first data unit of the first data stream. If the data processing device needs to learn the rear boundary of the first data unit of the first data stream, the data processing device may use a rear boundary of either AM of the AM1 and the AM2 as the rear boundary of the first data unit of the first data stream.

Using an example for description, if the front boundary of the AM overlaps the front boundary of the first data unit of the first data stream, that is, the first data unit of the first data stream carries the front boundary of the AM, the data processing device identifies the front boundary of the AM in the AM Lock manner, where the front boundary of the AM is the front boundary of the first data unit of the first data stream. The first skew may be a length between the front boundary of the first data unit of the first data stream and the front boundary of the first data amount, for example, the first skew may be a length between e and a shown in FIG. 4. Alternatively, the first skew may be a length between the front boundary of the first data unit of the first data stream and the rear boundary of the first data amount, for example, the first skew may be a length between a and f shown in FIG. 4.

Using an example for description, if the rear boundary of the AM overlaps the rear boundary of the first data unit of the first data stream, that is, the first data unit of the first data stream carries the rear boundary of the AM, the data processing device identifies the rear boundary of the AM in the AM Lock manner, where the rear boundary of the AM may be the rear boundary of the first data unit of the first data stream. The first skew is a length between the rear boundary of the first data unit of the first data stream and the rear boundary of the first data amount, for example, the first skew may be a length between c and f shown in FIG. 4. Alternatively, the first skew may be a length between the rear boundary of the first data unit of the first data stream and the front boundary of the first data amount, for example, the first skew may be a length between e and c shown in FIG. 4.

In this embodiment of the present invention, a data processing device may quickly and accurately identify, in an AM Lock manner, a boundary of an AM carried by a first data stream. The data processing device may determine a boundary of a first data unit of the first data stream by using the boundary of the AM, where the first data unit of the first data stream carries the boundary of the AM. In this way, the data processing device may obtain, by using a boundary of a first data amount and the identified boundary of the AM, a skew of the first data unit of the first data stream relative to the first data amount, and does not need to use an AM in another data stream as a reference AM, which helps to reduce FIFO resources, reduces processing complexity and costs, and helps to reduce system resources.

Embodiment 3

Embodiment 3 of the present invention provides a manner of adjusting the first data stream. A manner of adjusting the first data stream according to the first skew is not limited in this embodiment of the present invention, as long as a difference between the front boundary of the first data amount and the front boundary of the first data unit of the adjusted first data stream can be a length of an integral quantity of first data units. The manner of adjusting the first data stream that is provided by Embodiment 3 of the present invention may be applied to the method provided by Embodiment 1, or may be applied to a method combining Embodiment 1 and Embodiment 2, or may be applied to adjustment on another data stream, which is not described in detail herein again. The first data amount in Embodiment 3 may be the same as the first data amount in Embodiment 1 or Embodiment 2, which is not described in detail herein again. The first data unit of the first data stream in Embodiment 3 may be the same as the first data unit in Embodiment 1 or Embodiment 2, which is not described in detail herein again.

Embodiment 3 of the present invention provides at least three manners of adjusting, by the data processing device, the first data stream according to the first skew.

The first manner may include: obtaining, by the data processing device, a first length according to a difference between a length of the first skew and a length of an integral quantity of first data units, where the first length is less than the length of the first data unit; and removing, by the data processing device, data that starts from the boundary of the first data amount and whose length is the first length, to obtain the adjusted first data stream.

Using an example for description, in the adjusted first data stream, a length of data between the boundary of the first data unit and the boundary of the first data amount is a length of an integral quantity of first data units, for example, the length of the first data amount is M times of the length of the first data unit, where M is an integer greater than or equal to 1. If M is 1, the length of the first skew is the first length.

Using an example for description, if the first skew is a skew that is obtained according to the front boundary of the first data unit and the front boundary of the first data amount, and the length of the first skew is greater than the length of the first data unit, the first length is a difference between the length of the first skew and a length of N first data units, where N is a maximum quantity of first data units included in the first skew. For example, if the length of the first skew is a length of 2.4 first data units, and N is 2, the first length is a length of 0.4 first data unit.

Using an example for description, if the first skew is a skew that is obtained according to the rear boundary of the first data unit and the rear boundary of the first data amount, the length of the first skew is greater than the length of the first data unit, and the length of the AM is an integer multiple of the length of the first data unit, the first length is a difference between the length of the first data unit and a first difference, where the first difference is a difference between the length of the first skew and a length of L first data units, where the length of L first data units is greater than or equal to the length of the first skew. For example, if the length of the first skew is a length of 2.4 first data units, and L is 3, the first difference is a length of 0.6 first data unit, and the first length of a length of 0.4 first data unit. If the first skew is a skew that is obtained according to the rear boundary of the first data unit and the rear boundary of the first data amount, the length of the first skew is less than the length of the first data unit, and the length of the AM is an integer multiple of the length of the first data unit, the first length is a difference between the length of the first data unit and a first difference, where the first difference is the length of the first skew. For example, if the length of the first skew is a length of 0.4 first data unit, the first difference is a length of 0.6 first data unit, and the first length of a length of 0.4 first data unit.

Using an example for description, if the first skew is a skew that is obtained according to the rear boundary of the first data unit and the rear boundary of the first data amount, and the length of the AM is a fractional multiple of the first data unit, the data processing device may obtain, according to the rear boundary of the first data unit, the length of the AM, and the length of the first data amount, a length of data between the front boundary of the AM and the front boundary of the first data amount, that is, obtain the first length. A method for obtaining the first length is not described one by one by using an example.

The second manner may include: removing, by the data processing device, data that starts from the boundary of the first data amount and whose length is a second length, to obtain the adjusted first data stream, where the second length is a length of the first skew. Using an example for description, the data processing device obtains the adjusted first data stream according to the second length. In the adjusted first data stream, the front boundary of the first data amount overlaps the front boundary of the first data unit of the first data stream.

The third manner may include: obtaining, by the data processing device, a third length according to a difference between the length of the first skew and a length of X first data units, where the third length is greater than the length of the first data unit, where X is greater than or equal to 1 and is less than N; and removing, by the data processing device, data that starts from the boundary of the first data amount and whose length is the third length, to obtain the adjusted first data stream. Using an example for description, the data processing device obtains the adjusted first data stream according to the third length. In the adjusted first data stream, a length of at least one first data unit is included between the front boundary of the first data amount and the front boundary of the first data unit of the first data stream. Using an example for description, if the first skew is a skew that is obtained according to the front boundary of the first data unit and the front boundary of the first data amount, the length of the first skew is a length of 2.4 first data units, and X is 1, the third length of a length of 1.4 first data units.

In this embodiment of the present invention, the first data stream may include at least two data units, for example, the first data stream mentioned in the embodiment corresponding to FIG. 2 includes the first data unit and the second data unit, where the length of the first data unit is the same as the length of the second data unit.

Figure 5A:
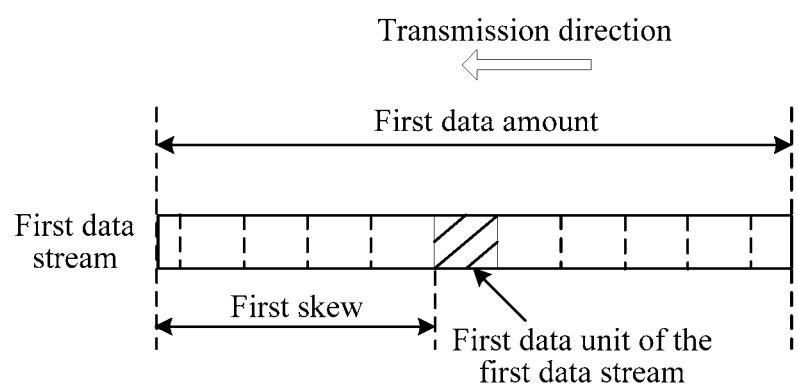
FIG. 5a is a schematic diagram of a first data stream according to an embodiment of the present invention.

FIG. 5a is a schematic diagram of a first data stream according to an embodiment of the present invention. A transmission direction of the first data stream shown in FIG. 5a is from right to left, that is, a direction shown by an arrow in FIG. 5a. If the length of the first data unit of the first data stream is 10 bits, and the length of the first data amount is a length of 10 first data units of the first data stream, the length of the first data amount is 100 bits. As shown in FIG. 5a, the first skew is a skew that is determined according to the front boundary of the first data amount and the front boundary of the first data unit of the first data stream, and the length of the first skew is 43 bits.

Figure 5B:
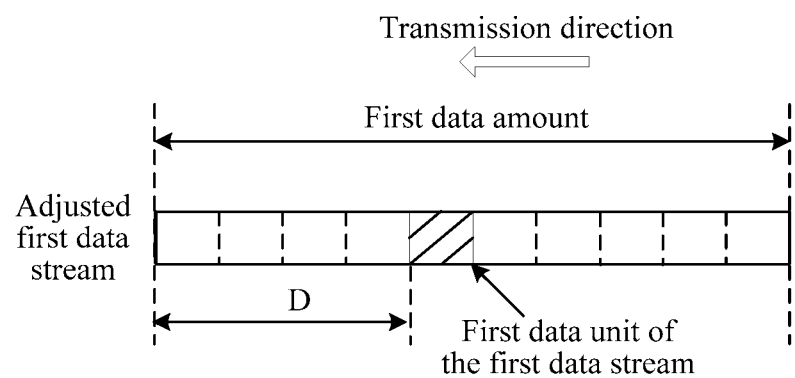
FIG. 5b is a schematic diagram of an adjusted first data stream according to an embodiment of the present invention.

If the data processing device obtains the first length in the first manner, the first length may be 3 bits. If the first length is 3 bits, the first length may be a length that is obtained by subtracting a length of four first data units from the length of the first skew. The data processing device may remove, according to the first length, data that starts from the front boundary of the first data amount and whose length is 3 bits. The adjusted first data stream is shown in FIG. 5b. FIG. 5b is a schematic diagram of an adjusted first data stream according to an embodiment of the present invention. A length of data between the front boundary of the first data unit in the adjusted first data stream and the front boundary of the first data amount is represented as D, and D is four times of the length of the first data unit of the first data stream.

If the data processing device obtains the second length in the second manner, the second length may be 43 bits. The data processing device may remove, according to the second length, data that starts from the front boundary of the first data amount and whose length is 43 bits. If the data processing device obtains the third length in the third manner, the third length may be 13 bits, 23 bits, or 33 bits. A processing manner for the third length of 13 bits, 23 bits, or 33 bits is the same as that for the first length of 3 bits, which is not described in detail herein again.

Optionally, the data processing device may obtain the first skew by using the front boundary of the first data unit of the first data stream and the front boundary of the first data amount. As shown in FIG. 5a, the first skew is 43 bits. The data processing device may obtain the adjusted first data stream in the first manner, that is, the data processing device may remove data that starts from the rear boundary of the first data amount and whose length is the first length. In this case, the first length may be −7 bits, −17 bits, or the like. If the first length is −7 bits, the first length may be a length that is obtained by subtracting a length of five first data units from the length of the first skew. The data processing device may remove data that starts from the rear boundary of the first data amount and whose length is 7 bits, to obtain the adjusted first data stream. In the adjusted first data stream, a difference between the rear boundary of the first data unit of the first data stream and the rear boundary of the first data amount is a length of four first data units of the first data stream. A processing manner for the first length of −17 bits or the like is the same as that for the first length of −7 bits, which is not described in detail herein again.

Figure 5C:
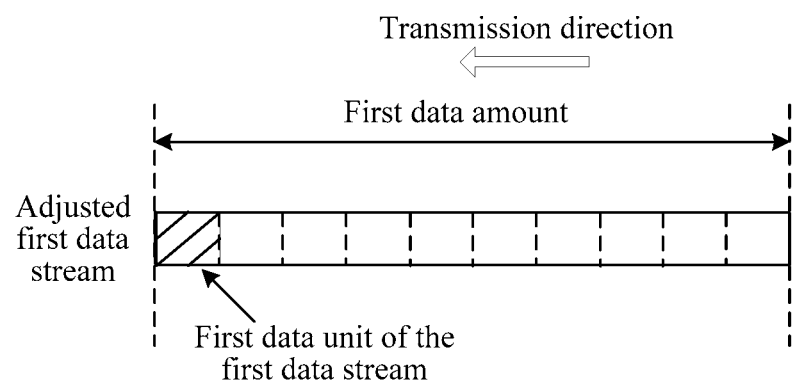
FIG. 5c is a schematic diagram of an adjusted first data stream according to an embodiment of the present invention.

If the data processing device uses the second manner, the second length is the length of the first skew, that is, the second length is 43 bits. If the first skew is determined according to the front boundary of the first data amount and the front boundary of the first data unit of the first data stream, the data processing device removes, in the second manner, data that starts from the front boundary the first data amount and whose length is the second length. For the adjusted first data stream, reference may be made to FIG. 5c, and FIG. 5c is a schematic diagram of an adjusted first data stream according to an embodiment of the present invention. The front boundary of the first data unit of the adjusted first data stream overlaps the front boundary of the first data amount.

In this embodiment of the present invention, a data processing device adjusts a first data stream according to a first skew, so that a difference between a boundary of a first data unit of the adjusted first data stream and a boundary of a first data amount is a length of an integral quantity of first data units of the first data stream, which can meet a condition for multiplexing, reduces operation complexity and costs, and is beneficial to deploy and implement bit width conversion.

Embodiment 4

Figure 6:
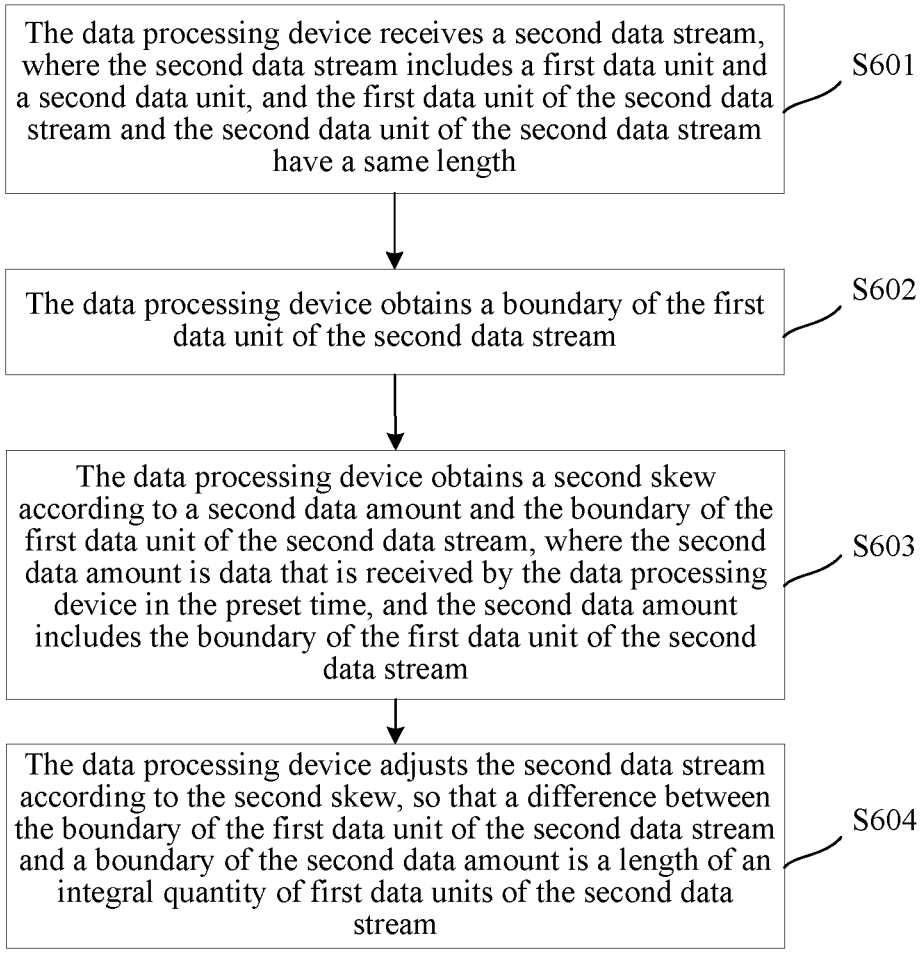
FIG. 6 is a flowchart of a data processing method according to an embodiment of the present invention.

In Embodiment 4 of the present invention, the data processing device may perform parallel processing on multiple data streams. In Embodiment 4 of the present invention, the data processing device may process a second data stream at the same time when processing or after processing the first data stream. As shown in FIG. 6, Embodiment 4 of the present invention provides a method for processing, by the data processing device, the second data stream, a method for processing, by the data processing device, the first data stream is not described in Embodiment 4 of the present invention, and for the method for processing, by the data processing device, the first data stream, reference may be made to any embodiment of Embodiment 1 to Embodiment 3, which is not described in detail herein again.

FIG. 6 is a flowchart of a data processing method according to an embodiment of the present invention, which includes:

S601: The data processing device receives a second data stream, where the second data stream includes a first data unit and a second data unit, and the first data unit of the second data stream and the second data unit of the second data stream have a same length.

Using an example for description, the second data stream and the first data stream may be data streams in parallel data streams that are obtained after same FEC processing, and may be used for bit width conversion. The first data unit of the second data stream and the first data unit of the first data stream may have a same length. The length of the first data unit of the second data stream may be at least one bit. That is, the first data unit of the second data stream may include one bit or more than one bit. For example, the first data unit of the second data stream may be a symbol, and a length of the symbol may be 10 bits. The length of the first data unit of the second data stream may also be one bit. The length of the first data unit of the second data stream is not described by using an example herein. The length of the first data unit of the second data stream is the same as the length of the second data unit of the second data stream, which may be that the first data unit of the second data stream and the second data unit of the second data stream have a same quantity of bits.

Using an example for description, the data processing device may receive the first data stream and the second data stream at the same time, and adjust the first data stream and the second data stream at the same time. In a specific implementation scenario, the first data stream and the second data stream may be data streams after the FEC processing.

S602: The data processing device obtains a boundary of the first data unit of the second data stream.

A manner of obtaining, by the data processing device, the boundary of the first data unit of the second data stream is similar to a manner of obtaining the boundary of the first data unit of the first data stream in S202, and is not described in detail herein again.

S603: The data processing device, a second skew according to a second data amount and the boundary of the first data unit of the second data stream, where the second data amount is data that is received by the data processing device within a preset time, and the second data amount includes the boundary of the first data unit of the second data stream.

Using an example for description, the preset time may be the same as the preset time in Embodiment 1. The data processing device may obtain the second skew by using a method for obtaining the first skew that is provided by any embodiment of Embodiment 1 to Embodiment 3, which is not described in detail herein again.

Using an example for description, the obtaining, by the data processing device, a second skew according to a second data amount and the boundary of the first data unit of the second data stream is: obtaining, by the data processing device, the second skew according to a front boundary of the second data amount and a front boundary of the first data unit of the second data stream. As shown in FIG. 3, the second skew may be the length between c and a shown in FIG. 3, that is, the quantity of bits between c and a shown in FIG. 3. Alternatively, the obtaining, by the data processing device, a second skew according to a second data amount and the boundary of the first data unit of the second data stream is: obtaining, by the data processing device, the second skew according to a rear boundary of the second data amount and a rear boundary of the first data unit of the second data stream. As shown in FIG. 3, the second skew may be the length between b and d shown in FIG. 3, that is, the quantity of bits between b and d shown in FIG. 3. Alternatively, the obtaining, by the data processing device, a second skew according to a second data amount and the boundary of the first data unit of the second data stream is: obtaining, by the data processing device, the second skew according to a front boundary of the second data amount and a rear boundary of the first data unit of the second data stream. As shown in FIG. 3, the second skew may be the length between c and b shown in FIG. 3, that is, the quantity of bits between c and b shown in FIG. 3. Alternatively, the obtaining, by the data processing device, a second skew according to a second data amount and the boundary of the first data unit of the second data stream is: obtaining, by the data processing device, the second skew according to a rear boundary of the second data amount and a front boundary of the first data unit of the second data stream. As shown in FIG. 3, the second skew may be the length between a and d shown in FIG. 3, that is, the quantity of bits between a and d shown in FIG. 3.

Optionally, the second data amount and the first data amount may have a same length, which helps to simplify processing and reduce system resources when the data processing device performs parallel processing on the first data stream and the second data stream.

S604: The data processing device adjusts the second data stream according to the second skew, so that a difference between the boundary of the first data unit of the second data stream and a boundary of the second data amount is a length of an integral quantity of first data units of the second data stream.

Using an example for description, the data processing device may adjust the second data stream by using the method provided by any embodiment of Embodiment 1 to Embodiment 3, which is not described in detail herein again.

Figure 7A:
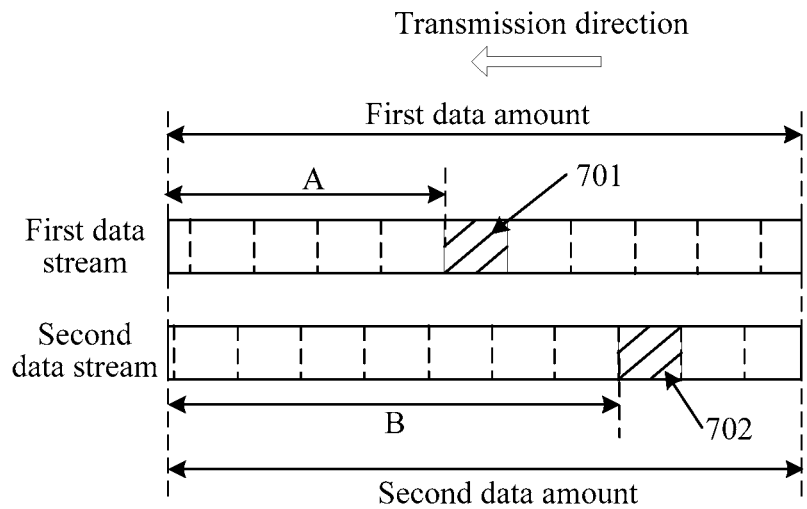
FIG. 7a is a schematic diagram of parallel processing on data streams according to an embodiment of the present invention.

FIG. 7a is a schematic diagram of parallel processing on data streams according to an embodiment of the present invention. In FIG. 7a, the first data amount and the second data amount may have a same length, for example, the first data amount and the second data amount are both of 100 bits. 701 is used to identify the first data unit of the first data stream. 702 is used to identify the first data unit of the second data stream. The lengths of the first data unit identified by 701 and the first data unit identified by 702 are the same, for example, are both 10 bits. Transmission directions of the first data stream and the second data stream are both from right to left, for example, a direction of an arrow shown in FIG. 7a. The data processing device may obtain, in the AM Lock manner, the boundary of the first data unit identified by 701 and the boundary of the first data unit identified by 702. In FIG. 7a, the data processing device obtains the first skew according to the front boundary of the first data amount and the front boundary of the first data unit identified by 701, where the first skew may be represented as A in FIG. 7a. The data processing device obtains the second skew according to the front boundary of the second data amount and the front boundary of the first data unit identified by 702, where the second skew may be represented as B in FIG. 7a. The length of A may be 43 bits, and the length of B may be 71 bits.

As shown in FIG. 7a, if the data processing device adjusts the first data stream and the second data stream in the first manner in Embodiment 3 of the present invention, the first length obtained by the data processing device may be 3 bits, and the first length is a length used to adjust the first data stream. The data processing device further obtains a length used to adjust the second data stream, where the length used to adjust the second data stream may be 1 bit. The data processing device removes data that starts from the front boundary of the first data amount and whose length is the first length, for example, removes data of 3 bits, to obtain the adjusted first data stream. The data processing device removes data that starts from the front boundary of the second data amount and whose length is a length used to adjust the second data stream, for example, removes data of 1 bit, to obtain the adjusted second data stream.

Figure 7B:
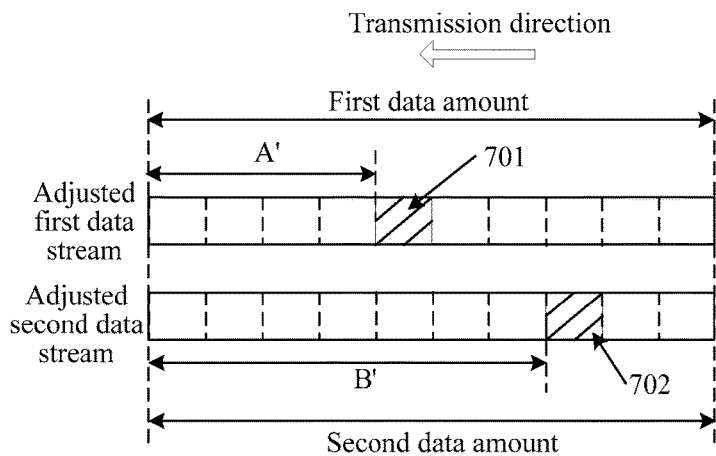
FIG. 7b is a schematic diagram of adjusted parallel data streams according to an embodiment of the present invention.

FIG. 7b is a schematic diagram of adjusted parallel data streams according to an embodiment of the present invention. As shown in FIG. 7b, a length between the front boundary of the first data unit of the adjusted first data stream and the front boundary of the first data amount is four times of the length of the first data unit of the first data stream, for example, the length of the first data unit of the first data stream is 10 bits, A' in FIG. 7b represents the length between the front boundary of the first data unit of the adjusted first data stream and the front boundary of the first data amount, and A' may be 40 bits. As shown in FIG. 7b, a length between the front boundary of the first data unit of the adjusted second data stream and the front boundary of the second data amount is seven times of the length of the first data unit of the second data stream, for example, the length of the first data unit of the second data stream is 10 bits, B' in FIG. 7b represents the length between the front boundary of the first data unit of the adjusted second data stream and the front boundary of the first data amount, and B' may be 70 bits.

In this embodiment of the present invention, a data processing device acquires, within a preset time, a second data amount including a boundary of first data unit of a second data stream; the data processing device determines a second skew according to the second data amount and the boundary of the first data unit of the second data stream; and the data processing device adjusts the second data stream according to the second skew, so that a difference between the boundary of the first data unit of the second data stream and a boundary of the second data amount is a length of an integral quantity of first data units of the second data stream. The data processing device adjusts, by using the second data amount as a reference, a skew of the boundary of the first data unit of the second data stream relative to the boundary of the second data amount, which helps to reduce data that needs to be processed; and the adjusted second data stream obtained by the data processing device can meet a subsequent condition for bit width conversion, which reduces operation complexity and costs, is beneficial to deploy and implement bit width conversion, and helps to reduce occupied FIFO resources.

In a process of the data processing, for different application scenarios, a granularity in the adjusted data stream obtained after the data processing may be different. The granularity may be understood as a basic unit of a data stream, for example, the granularity in the adjusted data stream obtained after the data processing may be a symbol of a length of 10 bits. A smaller granularity indicates a smaller basic unit in the data stream. A larger granularity indicates a larger basic unit in the data stream. Optionally, the data processing device sends the adjusted first data stream and the adjusted second data stream by using the first data unit as a granularity. Because the length of the first data unit of the first data stream is the same as the length of the first data unit of the second data stream, the first data unit may be the first data unit of the first data stream or the first data unit of the second data stream. The data processing device sends the adjusted first data stream and the adjusted second data stream in a poll manner. The poll manner for sending may be that the data processing device successively sends the data units in the adjusted first data stream and the adjusted second data stream. For example, the data processing device may successively send one data unit in the adjusted first data stream, one data unit in the adjusted second data stream, another data unit in the adjusted first data stream, and another data unit in the adjusted second data stream. The data unit in the adjusted first data stream is adjacent to the another data unit in the adjusted first data stream; and the data unit in the adjusted second data stream is adjacent to the another data unit in the adjusted second data stream. If the data processing device uses the poll manner for sending, the adjusted first data stream and the adjusted second data stream may be received by a modulator, a coder, or a precoder.

In a scenario of bit width conversion, the data processing device may send the adjusted first data stream and the adjusted second data stream to a multiplexer, so that the multiplexer performs a bit width conversion operation. In other words, the data processing device may send the adjusted first data stream and the adjusted second data stream to the multiplexer, where the multiplexer is configured to multiplex the adjusted first data stream and the adjusted second data stream, to generate a third data stream. The multiplexer corresponds to the data processing device, that is, the multiplexer may receive the adjusted first data stream and the adjusted second data stream that are sent by the data processing device.

A granularity in the adjusted data stream sent by the data processing device may be the same as or different from a granularity in the adjusted data stream multiplexed by the multiplexer. For example, a granularity in the adjusted first data stream sent by the data processing device is the first data unit of the first data stream, a granularity in the adjusted second data stream sent by the data processing device is the first data unit of the second data stream, and the lengths of the first data unit of the first data stream and the first data unit of the second data stream may both be 10 bits. Granularities in the adjusted first data stream and the adjusted second data stream multiplexed by the multiplexer may be of 10 bits, or may be granularities of less than 10 bits, for example, 1 bit, or may be granularities of more than 10 bits, for example, 20 bits.

Embodiment 5

This embodiment of the present invention may be applied before bit width conversion on a data stream, a relationship between a conversion circuit, a multiplexer (Mux), and a data processing device in a process of bit width conversion is further described in Embodiment 5 of the present invention by using such a specific application scenario of bit width conversion.

The conversion circuit may include a multiplexer and a data processing device. When one conversion circuit needs to multiplex M' received data streams to generate N' data streams, the conversion circuit includes N' multiplexers, and each multiplexer multiplexes K' received data streams into one data stream, where K' is an integer greater than or equal to 2, and K' is a quotient obtained by dividing M' by N', that is, K' may be a quotient of M'/N'. Before the multiplexer multiplex data streams, the data processing device in the conversion circuit may adjust a data stream used for multiplexing. In this embodiment of the present invention, the data processing device may correspond to the multiplexer in a one-to-one manner, that is, the conversion circuit may include N' data processing devices. N' is an integer greater than or equal to 1, and M' is an integer greater than N'. The data processing device does not need to use one data stream in the M' data streams as a reference to adjust remaining data streams in the M' data streams. The data processing device may adjust each data stream in the K' data streams by using the method provided by this embodiment of the present invention, which helps to reduce processing burden and processing complexity of the data processing device.

Figure 8:
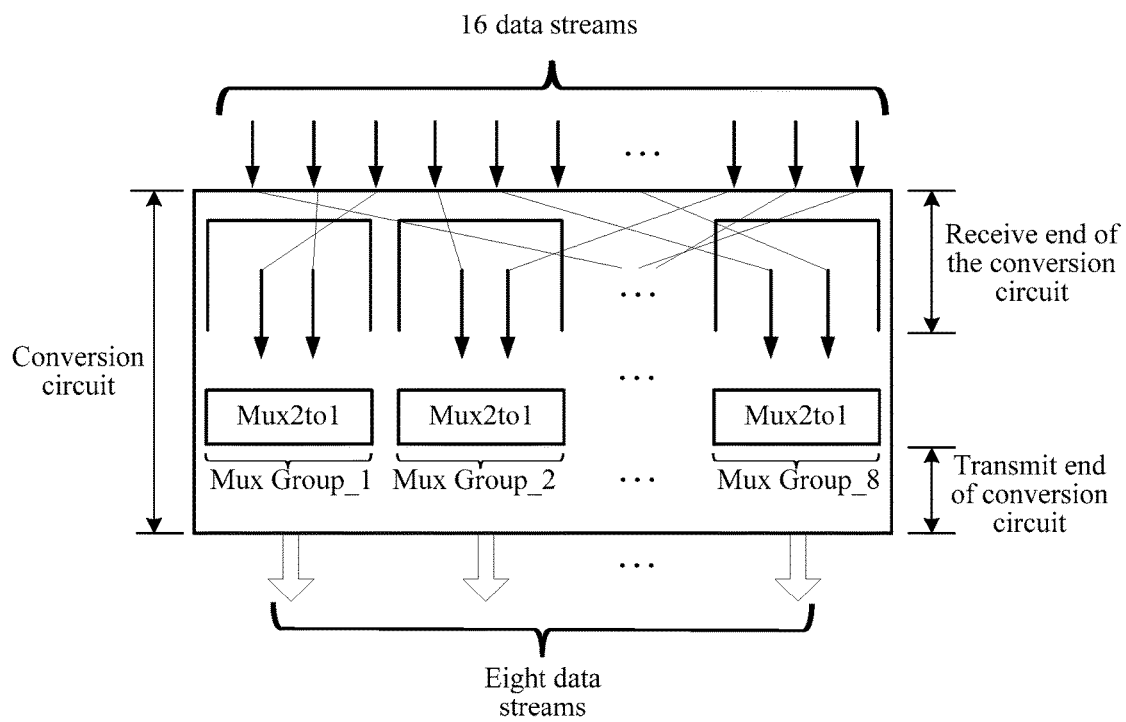
FIG. 8 is a schematic diagram of a bit width conversion scenario according to an embodiment of the present invention.

As shown in FIG. 8, FIG. 8 is a schematic diagram of a bit width conversion scenario according to an embodiment of the present invention. In FIG. 8, M' is 16, N' is 8, and K' is 2. Eight multiplexers are separately Mux Group_1 to Mux Group_8. Using a data processing device corresponding to the Mux Group_1 as an example, the data processing device may read two data streams, for example, the data processing device corresponding to the Mux Group_1 reads a first data stream and a second data stream. The data processing device may read a first data amount from the first data stream and read a second data amount of the second data stream by using a preset time as a period. The first data amount and the second data amount may be data amounts that are read by the data processing device in a same preset time. A length of the first data amount is the same as the length of the second data amount.

For example, the data processing may be performed by the data processing device. The data processing device may be disposed in the conversion circuit. The data processing device may be a component in a physical layer (PHY), a PHY chip, a system chip, or a multi-port Ethernet device. The PHY may be implemented by using a field programmable gate array (FPGA) or an application-specific integrated circuit (ASIC). The PHY may be a component in a network interface card (NIC), and the NIC may be a line card or a PIC (physical interface card). The PHY may include a media-independent interface (MII) configured to be connected to a Medium Access Control (MAC) sublayer.

This embodiment of the present invention may be applied to the Ethernet and an optical transport network (OTN) and may be further applied to another network environment in which bit width conversion needs to be performed.

When the conversion circuit performs a bit width conversion operation of data stream multiplexing, the multiplexer is configured to output a multiplexed data stream, for example, in a conversion circuit in which bit width conversion from M' to N' is performed, after the Mux Group_1 to the Mux Group_8 output eight data streams, the conversion circuit sends the eight data streams to a next network node, where the next network node may be another conversion circuit or a receiving device. Each data processing device may be configured to receive the K' data streams, and adjust the K' data streams.

The data processing method provided by this embodiment of the present invention may be applied to an optical module. By applying the data processing method provided by this embodiment of the present invention, the optical module does not need to perform a complete deskew operation, and when adjusting a first data stream, the optical module may not need to make reference to another data stream, so that a difference between a boundary of a first data unit of the adjusted first data stream and a boundary of a first data amount can be a length of an integral quantity of first data units. In this way, the adjusted first data stream already meets a basic condition for bit width conversion. In the method provided by this embodiment of the present invention, the optical module does not need to have a relatively high data processing capability, which simplifies a data processing operation, helps to reduce complexity of an inner data processing structure of the optical module, and reduces costs. In an application scenario of the optical module, the first data stream and a second data stream may be data streams in an electric chip, a third data stream may be a data stream in an optical chip, and the third data stream is a data stream that is obtained after the first data stream and the second data stream are multiplexed.

Embodiment 6

Figure 9:
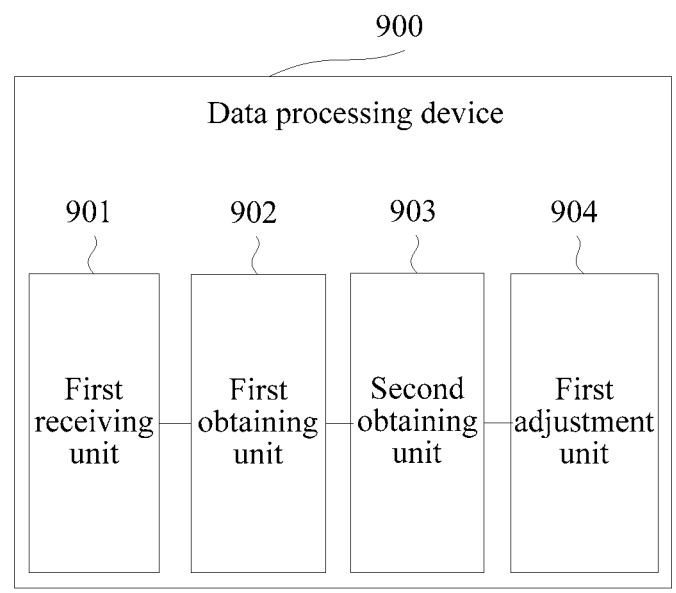
FIG. 9 is a structural diagram of a data processing device according to an embodiment of the present invention.

FIG. 9 is a structural diagram of a data processing device according to an embodiment of the present invention. The data processing device 900 may include:

a first receiving unit 901, configured to receive a first data stream, where the first data stream includes a first data unit and a second data unit, and the first data unit and the second data unit have a same length.

Using an example for description, the first data stream may be any data stream in parallel data streams that are obtained after FEC processing. For example, an FEC module may receive or generate a codeword (CW). The FEC module converts the codeword to multiple data units, and then, outputs the multiple data units to the data processing device in a parallel manner, where any data stream in the parallel data streams may be the first data stream. If a size of a codeword is 5280 bits (bits), and a size of a data unit is 10 bits, one codeword may include 528 data units, and the FEC module may output the 528 data units to the data processing device by using two parallel data streams.

The first data stream may be one of at least two data streams that are used to perform bit width conversion. The first data stream may be a data stream that is obtained after the FEC processing. The first data stream may include multiple data units, for example, the first data unit and the second data unit. The length of the first data unit of the first data stream may be at least one bit, that is, the first data unit of the first data stream may include one bit or more than one bit. For example, the first data unit of the first data stream may be a symbol, and a length of the symbol may be 10 bits. The length of the first data unit of the first data stream may also be one bit. The length of the first data unit of the first data stream is not described by using an example herein. The length of the first data unit of the first data stream is the same as the length of the second data unit of the first data stream, which may be that the first data unit of the first data stream and the second data unit of the first data stream have a same quantity of bits, for example, the first data unit of the first data stream is a symbol, and the second data unit of the first data stream is also a symbol.

a first obtaining unit 902, configured to obtain a boundary of the first data unit.

Using an example for description, the boundary of the first data unit may be a front boundary of the first data unit of the first data stream or a rear boundary of the first data unit of the first data stream. The front boundary of the first data unit may be understood as a boundary, which is located in front in a transmission direction, in two boundaries included in the first data unit. The transmission direction is a transmission direction of the first data stream. The rear boundary of the first data unit may be understood as a boundary, which is located in rear in the transmission direction, in the two boundaries included in the first data unit.

Using an example for description, a method for obtaining, by the first obtaining unit 902, the boundary of the first data unit of the first data stream is not limited in the present invention. This embodiment of the present invention also provides a preferred manner of acquiring, by the first obtaining unit 902, the boundary of the first data unit of the first data stream, which is described in detail in Embodiment 7 and is not described in detail herein again.

Using an example for description, the first obtaining unit 902 may obtain the boundary of the first data unit of the first data stream in an AM Lock manner or an FEC_CW Lock manner, which is described in detail in the following Embodiment 7 and is not described in detail herein again.

a second obtaining unit 903, configured to obtain a first skew according to a first data amount and the boundary of the first data unit, where the first data amount is data that is received by the data processing device within a preset time, and the first data amount includes the boundary of the first data unit.

Using an example for description, the first data amount may be understood as some contiguous data of the first data stream, and the boundary of the first data amount may be a front boundary of the first data amount or a rear boundary of the first data amount. The front boundary of the first data amount may be understood as a boundary, which is located in front in a transmission direction, in two boundaries included in the first data amount. The transmission direction is the transmission direction of the first data stream. The rear boundary of the first data amount may be understood as a boundary, which is located in rear in the transmission direction, in the two boundaries included in the first data amount.

Optionally, the preset time may include one or more clock periods, and the clock period may be understood as a period of a work clock of the data processing device.

Optionally, the length of the first data amount is a positive integer multiple of the length of the first data unit.

Using an example for description, the boundary of the first data amount may be a front boundary of the first data amount or a rear boundary of the first data amount. The front boundary of the first data amount may be understood as a boundary, which is located in front in the transmission direction, in two boundaries included in the first data amount. The rear boundary of the first data amount may be understood as a boundary, which is located in rear in the transmission direction, in the two boundaries included in the first data amount.

Using an example for description, the obtaining, by the second obtaining unit 903, a first skew according to a first data amount and the boundary of the first data unit includes: obtaining, by the second obtaining unit 903, the first skew according to the front boundary of the first data amount and the front boundary of the first data unit of the first data stream. As shown in FIG. 3, the first skew may be a length between c and a shown in FIG. 3, that is, a quantity of bits between c and a shown in FIG. 3. Alternatively, the obtaining, by the second obtaining unit 903, a first skew according to a first data amount and the boundary of the first data unit includes: obtaining, by the second obtaining unit 903, the first skew according to the rear boundary of the first data amount and the rear boundary of the first data unit of the first data stream. As shown in FIG. 3, the first skew may be a length between b and d shown in FIG. 3, that is, a quantity of bits between b and d shown in FIG. 3. Alternatively, the obtaining, by the second obtaining unit 903, a first skew according to a first data amount and the boundary of the first data unit includes: obtaining, by the second obtaining unit 903, the first skew according to the front boundary of the first data amount and the rear boundary of the first data unit of the first data stream. As shown in FIG. 3, the first skew may be a length between c and b shown in FIG. 3, that is, a quantity of bits between c and b shown in FIG. 3. Alternatively, the obtaining, by the second obtaining unit 903, a first skew according to a first data amount and the boundary of the first data unit includes: obtaining, by the second obtaining unit 903, the first skew according to the rear boundary of the first data amount and the front boundary of the first data unit of the first data stream. As shown in FIG. 3, the first skew may be a length between a and d shown in FIG. 3, that is, a quantity of bits between a and d shown in FIG. 3.

a first adjustment unit 904, configured to adjust the first data stream according to the first skew, so that a difference between the boundary of the first data unit and a boundary of the first data amount is a length of an integral quantity of first data units.

Using an example for description, the boundary of the first data unit of the first data stream processed by the first adjustment unit 904 may be the same as the boundary of the first data unit of the first data stream that is used by the second obtaining unit 903 to obtain the first skew. The boundary of the first data amount processed by the first adjustment unit 904 may be the same as the boundary of the first data amount that is used by the second obtaining unit 903 to obtain the first skew. For example, if the second obtaining unit 903 obtains the first skew according to the front boundary of the first data amount and the front boundary of the first data unit of the first data stream, the first adjustment unit 904 adjusts the first data stream by using the first skew, so that a difference between the front boundary of the first data unit of the first data stream and the front boundary of the first data amount is a length of an integral quantity of first data units of the first data stream.

Using an example for description, the boundary of the first data unit of the first data stream processed by the first adjustment unit 904 may be different from the boundary of the first data unit of the first data stream that is used by the second obtaining unit 903 to obtain the first skew. The boundary of the first data amount processed by the first adjustment unit 904 may be different from the boundary of the first data amount and the first data unit of the first data stream that is used by the second obtaining unit 903 to obtain the first skew. For example, if the second obtaining unit 903 obtains the first skew according to the rear boundary of the first data amount and the rear boundary of the first data unit of the first data stream, the first adjustment unit 904 adjusts the first data stream by using the first skew, so that a difference between the front boundary of the first data unit of the first data stream and the front boundary of the first data amount is a length of an integral quantity of first data units of the first data stream. If the second obtaining unit 903 obtains the first skew according to the front boundary of the first data amount and the rear boundary of the first data unit of the first data stream, the first adjustment unit 904 adjusts the first data stream by using the first skew, so that a difference between the front boundary of the first data unit of the first data stream and the front boundary of the first data amount is a length of an integral quantity of first data units of the first data stream. If the second obtaining unit 903 obtains the first skew according to the rear boundary of the first data amount and the front boundary of the first data unit of the first data stream, the first adjustment unit 904 adjusts the first data stream by using the first skew, so that a difference between the front boundary of the first data unit of the first data stream and the front boundary of the first data amount is a length of an integral quantity of first data units of the first data stream. If the second obtaining unit 903 obtains the first skew according to the front boundary of the first data amount and the front boundary of the first data unit of the first data stream, the first adjustment unit 904 adjusts the first data stream by using the first skew, so that a difference between the rear boundary of the first data unit of the first data stream and the rear boundary of the first data amount is a length of an integral quantity of first data units of the first data stream. Possible implementation manners are not described one by one by using an example herein.

In this embodiment of the present invention, a data processing device acquires, within a preset time, a first data amount including a boundary of a first data unit; the data processing device determines a first skew according to the first data amount and the boundary of the first data unit; and the data processing device adjusts a first data stream according to the first skew, so that a difference between the boundary of the first data unit and a boundary of the first data amount is a length of an integral quantity of first data units. The data processing device adjusts, by using the first data amount as a reference, a skew of the boundary of the first data unit relative to the boundary of the first data amount, which helps to reduce data that needs to be processed; and the adjusted first data stream obtained by the data processing device can meet a subsequent condition for bit width conversion, which reduces operation complexity and costs, is beneficial to deploy and implement bit width conversion, and helps to reduce occupied FIFO resources.

Embodiment 7

Embodiment 7 of the present invention provides a manner of obtaining, by the first obtaining unit 902, the boundary of the first data unit of the first data stream. The manner of obtaining, by the first obtaining unit 902, the boundary of the first data unit that is provided by Embodiment 7 of the present invention may be applied to the first obtaining unit 902 provided by Embodiment 6, or may be applied to acquisition, by the first obtaining unit 902, of a boundary of a first data unit in another data stream, which is not described in detail herein again. In Embodiment 7 of the present invention, a front boundary of an AM overlaps the front boundary of the first data unit, or a rear boundary of the AM overlaps the rear boundary of the first data unit. The first data unit mentioned in Embodiment 7 of the present invention is the first data unit of the first data stream.

Using an example for description, the first obtaining unit 902 may identify, in an AM Lock manner, the boundary of the AM carried by the first data unit. The first obtaining unit 902 may also identify, in an FEC_CW Lock manner, a boundary of an FEC_CW carried by the first data stream, and determines the boundary of the first data unit according to the boundary of the FEC_CW.

Using an example for description, the AM may occupy one or more data units in the first data stream, for example, the AM may occupy three data units, for example, the data units that are separately identified by 41, 43, and 44 in FIG. 4, or the AM may occupy 3.5 data units. For example, if a length of the AM is greater than or equal to the length of the first data unit of the first data stream, that the boundary of the AM overlaps the boundary of the first data unit of the first data stream may include: A first case: the front boundary of the AM overlaps the front boundary of the first data unit of the first data stream. The first data unit of the first data stream is the data unit identified by 41 in FIG. 4, the AM is 42 in FIG. 4, and the first data unit of the first data stream is a data unit carrying the front boundary of the AM. The front boundary of the AM and the front boundary of the first data unit of the first data stream are both a. The rear boundary of the AM may overlap the rear boundary of the first data unit of the first data stream, or may not overlap the rear boundary of the first data unit of the first data stream. A second case: the rear boundary of the AM may overlap the rear boundary of the first data unit of the first data stream. The first data unit may be the data unit identified by 44 in FIG. 4, the AM is 42 in FIG. 4, and the first data unit of the first data stream is a data unit carrying the rear boundary of the AM. The rear boundary of the AM and the rear boundary of the first data unit of the first data stream are both c. The front boundary of the AM may overlap the front boundary of the first data unit of the first data stream, or may not overlap the front boundary of the first data unit of the first data stream. If the length of the AM is less than the length of the first data unit of the first data stream, the front boundary of the AM overlaps the front boundary of the first data unit of the first data stream, or the rear boundary of the AM overlaps the rear boundary of the first data unit of the first data stream. When reading the first data amount of the first data stream, the second obtaining unit 903 may determine, by identifying the boundary of the AM carried by the first data stream, the boundary of the first data unit carrying the AM in the first data stream.

The AM Lock manner may be a process of locking the AM carried by the first data stream. The first obtaining unit 902 may determine a position of the boundary of the AM in the AM Lock manner. Using an example for description, the first obtaining unit 902 preconfigures an AM pattern of the first data stream. The first obtaining unit 902 may perform matching between the first data stream and the AM pattern, to identify the AM of the first data stream. For example, the first data stream carries at least two AMs, for example, an AM1 and an AM2, where the AM1 is adjacent to the AM2, and a rear boundary of the AM1 and a front boundary of the AM2 are located in different data amounts. If it is determined, in the AM Lock manner, that the AM1 and the AM2 separately match the AM pattern, the first obtaining unit 902 locks the first data stream. If the first obtaining unit 902 needs to learn the front boundary of the first data unit of the first data stream, the first obtaining unit 902 may use a front boundary of either AM of the AM1 and the AM2 as the front boundary of the first data unit of the first data stream. If the first obtaining unit 902 needs to learn the rear boundary of the first data unit of the first data stream, the first obtaining unit 902 may use a rear boundary of either AM of the AM1 and the AM2 as the rear boundary of the first data unit of the first data stream.

Using an example for description, if the front boundary of the AM overlaps the front boundary of the first data unit of the first data stream, that is, the first data unit of the first data stream carries the front boundary of the AM, the first obtaining unit 902 identifies the front boundary of the AM in the AM Lock manner, where the front boundary of the AM may be the front boundary of the first data unit of the first data stream. The first skew may be a length between the front boundary of the first data unit of the first data stream and the front boundary of the first data amount, for example, the first skew may be a length between e and a shown in FIG. 4. Alternatively, the first skew may be a length between the front boundary of the first data unit of the first data stream and the rear boundary of the first data amount, for example, the first skew may be a length between a and f shown in FIG. 4.

Using an example for description, if the rear boundary of the AM overlaps the rear boundary of the first data unit of the first data stream, that is, the first data unit of the first data stream carries the rear boundary of the AM, the first obtaining unit 902 identifies the rear boundary of the AM in the AM Lock manner, where the rear boundary of the AM may be the rear boundary of the first data unit of the first data stream. The first skew may be a length between the rear boundary of the first data unit of the first data stream and the rear boundary of the first data amount, for example, the first skew may be a length between c and f shown in FIG. 4. Alternatively, the first skew may be a length between the rear boundary of the first data unit of the first data stream and the front boundary of the first data amount, for example, the first skew may be a length between e and f shown in FIG. 4.

In this embodiment of the present invention, a data processing device may quickly and accurately identify, in an AM Lock manner, a boundary of an AM carried by a first data stream. The data processing device may determine a boundary of a first data unit of the first data stream by using the boundary of the AM, where the first data unit of the first data stream carries the boundary of the AM. In this way, the data processing device may obtain, by using a boundary of a first data amount and the identified boundary of the AM, a skew of the first data unit of the first data stream relative to the first data amount, and does not need to use an AM in another data stream as a reference AM, which helps to reduce FIFO resources, reduces processing complexity and costs, and helps to reduce system resources.

Embodiment 8

Embodiment 8 of the present invention provides a manner of adjusting, by the first adjustment unit 904, the first data stream. A specific manner of adjusting, by the first adjustment unit 904, the first data stream according to the first skew is not limited in this embodiment of the present invention, as long as a difference between the boundary of the first data unit of the adjusted first data stream and the boundary of the first data amount can be a length of an integral quantity of first data units. The manner of adjusting the first data stream provided by Embodiment 8 of the present invention may be applied to the first adjustment unit 904 provided by Embodiment 6, or may be applied to the first adjustment unit 904 combining Embodiment 6 and Embodiment 7, or may be applied to adjustment, by the first adjustment unit 904, of another data stream, which is not described in detail herein again. The first data amount may be the same as the first data amount in Embodiment 6 or Embodiment 7, which is not described in detail herein again. The first data unit of the first data stream may be the same as the first data unit in Embodiment 6 or Embodiment 7, which is not described in detail herein again. The first data unit mentioned in Embodiment 8 of the present invention is the first data unit of the first data stream.

Embodiment 8 of the present invention provides the following manners for adjusting, by the first adjustment unit 904, the first data stream according to the first skew.

The first manner may include: obtaining, by the first adjustment unit 904, a first length according to a difference between a length of the first skew and a length of an integral quantity of first data units, where the first length is less than the length of the first data unit; and removing, by the first adjustment unit 904, data that starts from the boundary of the first data amount and whose length is the first length, to obtain the adjusted first data stream.

The second manner may include: removing, by the first adjustment unit 904, data that starts from the boundary of the first data amount and whose length is a second length, to obtain the adjusted first data stream, where the second length is a length of the first skew. Using an example for description, the first adjustment unit 904 obtains the adjusted first data stream according to the second length. In the adjusted first data stream, the front boundary of the first data amount overlaps the front boundary of the first data unit of the first data stream.

The third manner may include: obtaining, by the first adjustment unit 904, a third length according to a difference between the length of the first skew and a length of X first data units, where the third length is greater than the length of the first data unit, where X is greater than or equal to 1 and is less than N; and removing, by the first adjustment unit 904, data that starts from the boundary of the first data amount and whose length is the third length, to obtain the adjusted first data stream. Using an example for description, the first adjustment unit 904 obtains the adjusted first data stream according to the third length. In the adjusted first data stream, a length of at least one first data unit is included between the front boundary of the first data amount and the front boundary of the first data unit of the first data stream.

In this embodiment of the present invention, the first adjustment unit 904 may perform the adjustment in the three manners in Embodiment 3, and a specific embodiment is not described in detail herein again.

In this embodiment of the present invention, the first adjustment unit 904 adjusts the first data stream according to a first skew, so that a difference between a boundary of a first data unit of the adjusted first data stream and a boundary of the first data amount is a length of an integral quantity of first data units of the first data stream, which can meet a condition for multiplexing, reduces operation complexity and costs, and is beneficial to deploy and implement bit width conversion.

Embodiment 9

Figure 10:
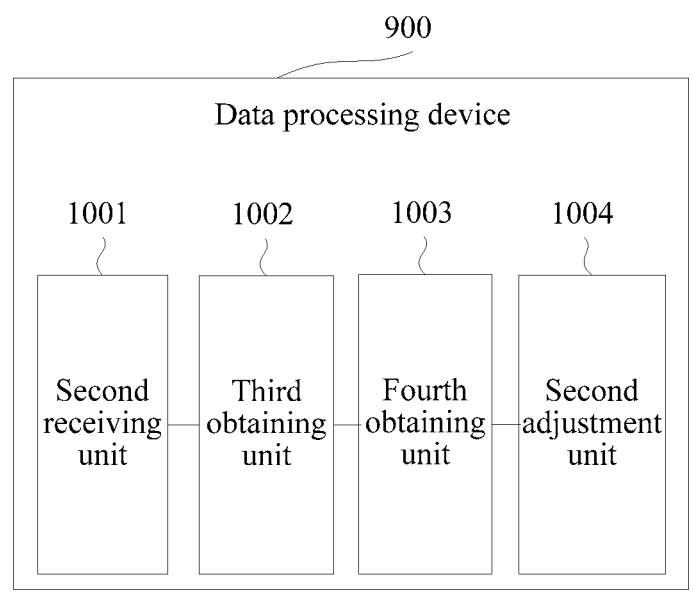
FIG. 10 is a structural diagram of a data processing device according to an embodiment of the present invention.

In Embodiment 9 of the present invention, the data processing device 900 can perform parallel processing on multiple data streams. In Embodiment 9 of the present invention, the data processing device 900 may process a second data stream at the same time when processing or after processing a first data stream. As shown in FIG. 10, Embodiment 9 of the present invention provides a method for processing, by the data processing device 900, the second data stream, a method for processing, by the data processing device 900, the first data stream is not described in Embodiment 9 of the present invention, and for the method for processing, by the data processing device 900, the first data stream, reference may be made to any embodiment of Embodiment 6 to Embodiment 8, which is not described in detail herein again.

FIG. 10 is a structural diagram of a data processing device according to an embodiment of the present invention. The data processing device 900 further includes:

a second receiving unit 1001, configured to receive a second data stream, where the second data stream includes a first data unit and a second data unit, and the first data unit of the second data stream and the second data unit of the second data stream have a same length.

Using an example for description, the second data stream and the first data stream may be data streams in parallel data streams that are obtained after same FEC processing, and may be used for bit width conversion. The length of the first data unit of the second data stream is the same as the length of the first data unit of the first data stream. The length of the first data unit of the second data stream may be at least one bit. That is, the first data unit of the second data stream may include one bit or more than one bit. For example, the first data unit of the second data stream may be a symbol, and a length of the symbol may be 10 bits. The length of the first data unit of the second data stream may also be one bit. The length of the first data unit of the second data stream is not described by using an example herein. The length of the first data unit of the second data stream is the same as the length of the second data unit of the second data stream, which may be that the first data unit of the second data stream and the second data unit of the second data stream have a same quantity of bits. The second receiving unit 1001 may be the same as or may be different from the first receiving unit 901 in Embodiment 6.

Using an example for description, the data processing device 900 may receive the first data stream and the second data stream at the same time by using the first receiving unit 901 and the second receiving unit 1001, and adjust the first data stream and the second data stream at the same time. In a specific implementation scenario, the first data stream and the second data stream may be data streams after the FEC processing.

a third obtaining unit 1002, configured to obtain a boundary of the first data unit of the second data stream.

A manner of obtaining, by the third obtaining unit 1002, the boundary of the first data unit of the second data stream is similar to a manner of obtaining, by the first obtaining unit 902, the boundary of the first data unit of the first data stream in Embodiment 6, and is not described in detail herein again. The third obtaining unit 1002 may be the same as or may be different from the first obtaining unit 902 in Embodiment 6.

a fourth obtaining unit 1003, configured to obtain a second skew according to a second data amount and the boundary of the first data unit of the second data stream, where the second data amount is data that is received by the data processing device in the preset time, and the second data amount includes the boundary of the first data unit of the second data stream.

Using an example for description, the preset time may be the same as the preset time in Embodiment 6. The fourth obtaining unit 1003 may obtain the second skew by using a method for obtaining, by the second obtaining unit 903, the first skew that is provided by any embodiment of Embodiment 6 to Embodiment 8, which is not described in detail herein again. The fourth obtaining unit 1003 may be the same as or may be different from the second obtaining unit 903 in Embodiment 6.

Using an example for description, the obtaining, by the fourth obtaining unit 1003, a second skew according to a second data amount and the boundary of the first data unit of the second data stream is: obtaining, by the fourth obtaining unit 1003, the second skew according to a front boundary of the second data amount and a front boundary of the first data unit of the second data stream. As shown in FIG. 3, the second skew may be the length between c and a shown in FIG. 3, that is, the quantity of bits between c and a shown in FIG. 3. Alternatively, the obtaining, by the fourth obtaining unit 1003, a second skew according to a second data amount and the boundary of the first data unit of the second data stream is: obtaining, by the fourth obtaining unit 1003, the second skew according to a rear boundary of the second data amount and a rear boundary of the first data unit of the second data stream. As shown in FIG. 3, the second skew may be the length between b and d shown in FIG. 3, that is, the quantity of bits between b and d shown in FIG. 3. Alternatively, the obtaining, by the fourth obtaining unit 1003, a second skew according to a second data amount and the boundary of the first data unit of the second data stream is: obtaining, by the fourth obtaining unit 1003, the second skew according to a front boundary of the second data amount and a rear boundary of the first data unit of the second data stream. As shown in FIG. 3, the second skew may be the length between c and b shown in FIG. 3, that is, the quantity of bits between c and b shown in FIG. 3. Alternatively, the obtaining, by the fourth obtaining unit 1003, a second skew according to a second data amount and the boundary of the first data unit of the second data stream is: obtaining, by the fourth obtaining unit 1003, the second skew according to a rear boundary of the second data amount and a front boundary of the first data unit of the second data stream. As shown in FIG. 3, the second skew may be the length between a and d shown in FIG. 3, that is, the quantity of bits between a and d shown in FIG. 3.

Optionally, the second data amount and the first data amount may have a same length, which helps to simplify processing and reduce system resources when the data processing device performs parallel processing on the first data stream and the second data stream.

a second adjustment unit 1004, configured to adjust the second data stream according to the second skew, so that a difference between the boundary of the first data unit of the second data stream and a boundary of the second data amount is a length of an integral quantity of first data units of the second data stream.

Using an example for description, the second adjustment unit 1004 may adjust the second data stream in a manner of adjusting, by the first adjustment unit 904, the first data amount that is provided by any embodiment of Embodiment 6 to Embodiment 8, which is not described in detail herein again. The second adjustment unit 1004 may be the same as or may be different from the first adjustment unit 904 in Embodiment 6.

In this embodiment of the present invention, a data processing device acquires, within a preset time, a second data amount including a boundary of first data unit of a second data stream; the data processing device determines a second skew according to the second data amount and the boundary of the first data unit of the second data stream; and the data processing device adjusts the second data stream according to the second skew, so that a difference between the boundary of the first data unit of the second data stream and a boundary of the second data amount is a length of an integral quantity of first data units of the second data stream. The data processing device adjusts, by using the second data amount as a reference, a skew of the boundary of the first data unit of the second data stream relative to the boundary of the second data amount, which helps to reduce data that needs to be processed; and the adjusted second data stream obtained by the data processing device can meet a subsequent condition for bit width conversion, which reduces operation complexity and costs, is beneficial to deploy and implement bit width conversion, and helps to reduce occupied FIFO resources.

Figure 11:
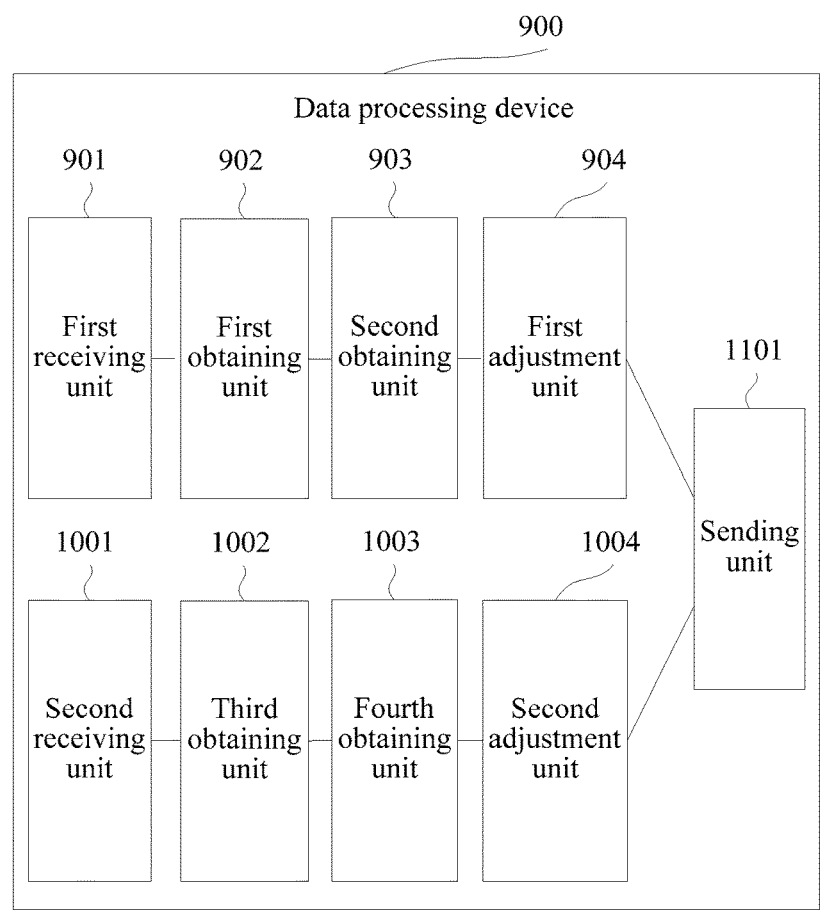
FIG. 11 is a structural diagram of a data processing device according to an embodiment of the present invention.

In a process of the data processing, for different application scenarios, a granularity in the adjusted data stream obtained after the data processing may be different. The granularity may be understood as a basic unit of a data stream, for example, the granularity in the adjusted data stream obtained after the data processing may be a symbol of a length of 10 bits. A smaller granularity indicates a smaller basic unit in the data stream. A larger granularity indicates a larger basic unit in the data stream. Optionally, based on FIG. 9 and FIG. 10, FIG. 11 is a structural diagram of a data processing device according to an embodiment of the present invention. The data processing device 900 further includes a sending unit 1101.

The sending unit 1101 is configured to the adjusted first data stream and the adjusted second data stream by using the first data unit as a granularity.

Using an example for description, because the length of the first data unit of the first data stream is the same as the length of the first data unit of the second data stream, the first data unit may be the first data unit of the first data stream or the first data unit of the second data stream. The sending unit 1101 may send the adjusted first data stream and the adjusted second data stream in a poll manner. The poll manner for sending may be the same as the poll manner for sending in Embodiment 4, and is not described in detail herein again.

In a scenario of bit width conversion, the sending unit 1101 may send the adjusted first data stream and the adjusted second data stream to a multiplexer, so that the multiplexer performs a bit width conversion operation. In other words, the sending unit 1101 may send the adjusted first data stream and the adjusted second data stream to the multiplexer, where the multiplexer is configured to multiplex the adjusted first data stream and the adjusted second data stream, to generate a third data stream. The multiplexer corresponds to the sending unit 1101, that is, the multiplexer may receive the adjusted first data stream and the adjusted second data stream that are sent by the sending unit 1101.

A granularity in the adjusted data stream sent by the sending unit 1101 may be the same as or different from a granularity in the adjusted data stream multiplexed by the multiplexer. For example, a granularity in the adjusted first data stream sent by the sending unit 1101 is the first data unit of the first data stream, a granularity in the adjusted second data stream sent by the sending unit 1101 is the first data unit of the second data stream, and the lengths of the first data unit of the first data stream and the first data unit of the second data stream may both be 10 bits. Granularities in the adjusted first data stream and the adjusted second data stream multiplexed by the multiplexer may be of 10 bits, or may be granularities of less than 10 bits, for example, 1 bit, or may be granularities of more than 10 bits, for example, 20 bits.

Embodiment 10

Figure 12:
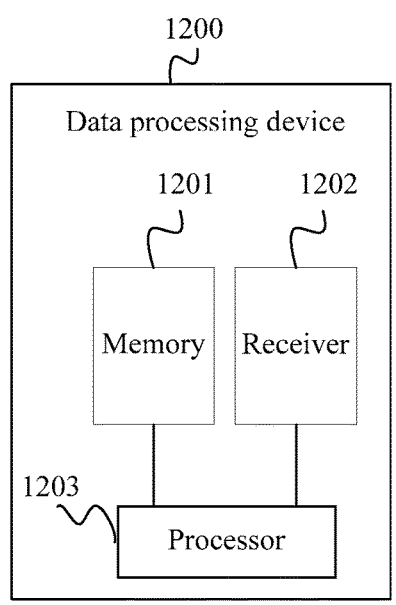
FIG. 12 is a schematic diagram of a hardware structure of a data processing device according to an embodiment of the present invention.

Referring to FIG. 12, FIG. 12 is a schematic diagram of a hardware structure of a data processing device according to an embodiment of the present invention. The data processing device 1200 includes a memory 1201 and a receiver 1202, and a processor 1203 that is separately connected to the memory 1201 and the receiver 1202, where the memory 1201 is configured to store a group of program instructions, and the processor 1203 is configured to invoke the program instructions stored in the memory 1201 to perform the following operations:

triggering the receiver 1202 to receive a first data stream, where the first data stream includes a first data unit and a second data unit, and the first data unit and the second data unit have a same length;

obtaining a boundary of the first data unit;

obtaining a first skew according to a first data amount and the boundary of the first data unit, where the first data amount is data that is received by the data processing device within a preset time, and the first data amount includes the boundary of the first data unit; and adjusting the first data stream according to the first skew, so that a difference between the boundary of the first data unit and a boundary of the first data amount is a length of an integral quantity of first data units.

Optionally, the processor 1203 may be a central processing unit (CPU), the memory 1201 may be an inner memory of a random access memory (RAM) type, and the receiver 1202 may include a common physical interface, where the physical interface may be an Ethernet interface or an asynchronous transfer mode (ATM) interface. The processor 1203, the receiver 1202, and the memory 1201 may be integrated into one or more independent circuits or hardware, for example, an application-specific integrated circuit (ASIC).

The data processing device 1200 may use the method provided by any embodiment of Embodiment 1 to Embodiment 4. The data processing device 1200 may display, from a logic perspective, content included in the data processing device, and the data processing device in Embodiment 6 to Embodiment 9 may display, from a physical perspective, content included in the data processing device.

"First" in the first data stream, the first data unit, the first data amount, the first skew, and the first length that are mentioned in the embodiments of the present invention is merely a name for identification, and does not represent the first place in the sense of order. The rule is also applicable to "second" and "third".

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium may be at least one of the following media: any medium that can store program code, such as a read-only memory (ROM), a RAM, a magnetic disk, or an optical disc.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly; and for related parts, reference may be made to partial descriptions in the method embodiment. The described device and system embodiments are merely exemplary. The units described as separate parts may or may not be physically separate, and parts displayed as units may or may not be physical units, may be located in one position, or may be distributed on multiple network units. Some or all of the modules may be selected according to actual requirements to achieve the objectives of the solutions of the embodiments. A person of ordinary skill in the art may understand and implement the embodiments of the present invention without creative efforts.

The foregoing descriptions are merely exemplary embodiments of the present invention, but are not intended to limit the protection scope of the present invention. It should be noted that a person of ordinary skill in the art may make various improvements and refinements without departing from the principle of the present invention. All such modifications and refinements shall still fall within the protection scope of the present invention. Additionally, statements made herein characterizing the invention refer to an embodiment of the invention and not necessarily all embodiments.

What is claimed is:

1. A data processing method, wherein the method comprises:
receiving, by a data processing device, a first data stream, wherein the first data stream comprises a first data unit and a second data unit, and the first data unit and the second data unit have a same length;
obtaining, by the data processing device, a boundary of the first data unit;
obtaining, by the data processing device, a first skew according to a first data amount and the boundary of the first data unit, wherein the first data amount is data that is received by the data processing device within a preset time, and the first data amount comprises the boundary of the first data unit; and
adjusting, by the data processing device, the first data stream according to the first skew, so that the length of the difference between the boundary of the first data unit and a boundary of the first data amount corresponds to an integral quantity of first data units.

2. The method according to claim 1, wherein the first data unit carries an alignment marker (AM), and obtaining the boundary of the first data unit comprises:
identifying, by the data processing device, in an alignment marker lock manner, a boundary of the AM carried by the first data unit, wherein the boundary of the AM is the boundary of the first data unit.

3. The method according to claim 1, wherein adjusting the first data stream according to the first skew comprises:
obtaining, by the data processing device, a first length according to the difference between the length of the first skew and the length of the integral quantity of first data units, wherein the first length is less than the length of the first data unit; and
removing, by the data processing device, data that starts from the boundary of the first data amount, to obtain an adjusted first data stream, wherein the amount of data removed corresponds to the first length.

4. The method according to claim 1, wherein adjusting the first data stream according to the first skew comprises:
removing, by the data processing device, data that starts from the boundary of the first data amount, to obtain an adjusted first data stream, wherein the amount of data removed corresponds to the length of the first skew.

5. The method according to claim 1, wherein the length of the first data amount is a positive integer multiple of the length of the first data unit.

6. The method according to claim 1, wherein the method further comprises:
receiving, by the data processing device, a second data stream, wherein the second data stream comprises a first data unit and a second data unit, and the first data unit of the second data stream and the second data unit of the second data stream have a same length;
obtaining, by the data processing device, a boundary of the first data unit of the second data stream;
obtaining, by the data processing device, a second skew according to a second data amount and the boundary of the first data unit of the second data stream, wherein the second data amount is data that is received by the data processing device within the preset time, and the second data amount comprises the boundary of the first data unit of the second data stream; and
adjusting, by the data processing device, the second data stream according to the second skew, so that the length of the difference between the boundary of the first data unit of the second data stream and a boundary of the second data amount corresponds to an integral quantity of first data units of the second data stream.

7. The method according to claim 6, wherein the method further comprises:
sending, by the data processing device, the adjusted first data stream and the adjusted second data stream by using the length of the first data unit of the first data stream as a granularity, wherein the length of the first data unit of the first data stream is the same as the length of the first data unit of the second data stream.

8. The method according to claim 6, wherein the method further comprises:
sending, by the data processing device, the adjusted first data stream and the adjusted second data stream to a multiplexer, wherein the multiplexer is configured to multiplex the adjusted first data stream and the adjusted second data stream, to generate a third data stream.

9. A data processing device, wherein the device comprises:
a non-transitory memory having processor-executable instructions stored thereon;
a receiver; and
a processor, coupled to the non-transitory memory, wherein the processor is configured to execute the processor-executable instructions to facilitate:
triggering the receiver to receive a first data stream, wherein the first data stream comprises a first data unit and a second data unit, and the first data unit and the second data unit have a same length;
obtaining a boundary of the first data unit;
obtaining a first skew according to a first data amount and the boundary of the first data unit, wherein the first data amount is data that is received by the data processing device within a preset time, and the first data amount comprises the boundary of the first data unit; and
adjusting the first data stream according to the first skew, so that the length of the difference between the boundary of the first data unit and the boundary of the first data amount corresponds to an integral quantity of first data units.

10. The device according to claim 9, wherein the first data unit carries an alignment marker (AM), and obtaining the boundary of the first data unit comprises:
identifying, in an alignment marker lock manner, a boundary of the AM carried by the first data unit, wherein the boundary of the AM is the boundary of the first data unit.

11. The device according to claim 9, wherein adjusting the first data stream according to the first skew comprises:
obtaining a first length according to the difference between the length of the first skew and the length of the integral quantity of first data units wherein the first length is less than the length of the first data unit; and
removing data that starts from the boundary of the first data amount, to obtain an adjusted first data stream, wherein the amount of data removed corresponds to the first length.

12. The device according to claim 9, wherein adjusting the first data stream according to the first skew comprises:
removing data that starts from the boundary of the first data amount, to obtain an adjusted first data stream, wherein the amount of data removed corresponds to the length of the first skew.

13. The device according to claim 9, wherein the length of the first data amount is a positive integer multiple of the length of the first data unit.

14. The device according to claim 9, wherein the processor is further configured to execute the processor-executable instructions to facilitate:

receiving a second data stream, wherein the second data stream comprises a first data unit and a second data unit, and the first data unit of the second data stream and the second data unit of the second data stream have a same length;

obtaining a boundary of the first data unit of the second data stream;

obtaining a second skew according to a second data amount and the boundary of the first data unit of the second data stream, wherein the second data amount is data that is received by the data processing device within the preset time and the second data amount comprises the boundary of the first data unit of the second data stream; and adjusting the second data stream according to the second skew, so that the length of the difference between the boundary of the first data unit of the second data stream and a boundary of the second data amount corresponds to an integral quantity of first data units of the second data stream.

15. The device according to claim 14, wherein the processor is further configured to execute the processor-executable instructions to facilitate:

sending the adjusted first data stream and the adjusted second data stream by using the length of the first data unit of the first data stream as a granularity, wherein the length of the first data unit of the first data stream is the same as the length of the first data unit of the second data stream.

16. The device according to claim 14, wherein the processor is further configured to execute the processor-executable to facilitate:

sending the adjusted first data stream and the adjusted second data stream to a multiplexer, wherein the multiplexer is configured to multiplex the adjusted first data stream and the adjusted second data stream, to generate a third data stream.

17. The device according to claim 9, wherein the device is a routing device, a switch, or an electronic chip.

* * * * *